United States Patent
Avitabile et al.

(10) Patent No.: US 12,227,947 B2
(45) Date of Patent: Feb. 18, 2025

(54) CAP SHINGLES FOR ROOFING SYSTEMS

(71) Applicant: BMIC LLC, Dallas, TX (US)

(72) Inventors: Jeffrey S. Avitabile, Fair Lawn, NJ (US); Luis Duque, Hackensack, NJ (US); Ming-Liang Shiao, Collegeville, PA (US); Olan T. Leitch, Mt. Juliet, TN (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/610,359

(22) Filed: Mar. 20, 2024

(65) Prior Publication Data
US 2024/0318430 A1  Sep. 26, 2024

Related U.S. Application Data

(60) Provisional application No. 63/453,644, filed on Mar. 21, 2023.

(51) Int. Cl.
*E04D 1/30* (2006.01)
*B32B 5/02* (2006.01)
*B32B 5/16* (2006.01)
*B32B 5/24* (2006.01)
(Continued)

(52) U.S. Cl.
CPC .......... *E04D 1/30* (2013.01); *B32B 5/02* (2013.01); *B32B 5/16* (2013.01); *B32B 5/24* (2013.01); *B32B 5/30* (2013.01); *B32B 2255/02* (2013.01); *B32B 2255/26* (2013.01);
(Continued)

(58) Field of Classification Search
CPC ........... E04D 1/30; E04D 2001/005; E04D 2001/305; B32B 5/02; B32B 5/16; B32B 5/24; B32B 5/30; B32B 2255/02; B32B 2255/26; B32B 2255/28; B32B 2419/06
See application file for complete search history.

(56) References Cited

U.S. PATENT DOCUMENTS 4,368,604 A  1/1983 Spielau et al.
4,469,731 A  9/1984 Saracino
(Continued)

FOREIGN PATENT DOCUMENTS

WO  WO2022/253679 A1  12/2022
WO  WO2022/271620 A1  12/2022
WO  WO2023/014771 A1  2/2023

OTHER PUBLICATIONS

Soprema; 2-1 Soprasmart® ISO HD—Product Data Sheet; www.soprema.us; undated.

*Primary Examiner* — Adriana Figueroa
(74) *Attorney, Agent, or Firm* — Womble Bond Dickinson (US) LLP

(57) ABSTRACT

A roofing system including a cap shingle and methods of producing a cap shingle and forming a roof are disclosed. In one embodiment, the cap shingle can include at least one layer of shingle material including an upper surface having a headlap portion and an exposure portion, and a lower surface. A sealant can be applied along the lower surface and a sealant attachment zone can be positioned along the upper surface of the at least one layer of shingle material between the headlap and exposure portions. The sealant attachment zone can be configured to contact a sealant applied along a lower surface of a next cap shingle to promote adhesion between the cap shingles installed along a ridge, hip, or cap of the roof.

15 Claims, 6 Drawing Sheets

(51) Int. Cl.
    *B32B 5/30*     (2006.01)
    *E04D 1/00*     (2006.01)

(52) U.S. Cl.
    CPC ....... *B32B 2255/28* (2013.01); *B32B 2419/06* (2013.01); *E04D 2001/005* (2013.01); *E04D 2001/305* (2013.01)

(56) References Cited

U.S. PATENT DOCUMENTS

| | | | |
|---|---|---|---|
| 5,467,568 A * | 11/1995 | Sieling | E04D 3/40 52/553 |
| 6,578,336 B2 * | 6/2003 | Elliott | E04D 1/26 52/557 |
| 7,073,295 B2 * | 7/2006 | Pressutti | E04D 1/30 52/745.19 |
| 7,607,271 B2 | 10/2009 | Griffin et al. | |
| 8,245,482 B2 * | 8/2012 | Grubka | E04D 1/30 454/365 |
| 9,290,943 B2 * | 3/2016 | Grubka | E04D 1/30 |
| 9,476,202 B2 | 10/2016 | Clancy et al. | |
| 9,650,787 B2 * | 5/2017 | Montojo | E04D 1/30 |
| 10,260,237 B2 | 4/2019 | Hubbard et al. | |
| 10,815,666 B2 | 10/2020 | Kelly | |
| 10,913,235 B2 | 2/2021 | Nandi et al. | |
| 11,313,127 B2 * | 4/2022 | Grubka | E04D 1/30 |
| 11,319,708 B2 | 5/2022 | Leatherman et al. | |
| 11,834,835 B2 | 12/2023 | Svec et al. | |
| 11,945,983 B2 | 4/2024 | Ackermann et al. | |
| 11,952,779 B2 | 4/2024 | Budinscak, Jr. et al. | |
| 2003/0082365 A1 | 5/2003 | Geary et al. | |
| 2004/0068232 A1 | 4/2004 | Hart et al. | |
| 2004/0182032 A1 | 9/2004 | Koschitzky | |
| 2004/0226247 A1 | 11/2004 | Byrd | |
| 2005/0126099 A1 | 6/2005 | Kelly | |
| 2006/0083889 A1 | 4/2006 | Schuckers | |
| 2010/0170178 A1 | 7/2010 | Bennett et al. | |
| 2011/0000159 A1 | 1/2011 | Ben-Daat et al. | |
| 2011/0005158 A1 * | 1/2011 | Kailey | E04D 1/30 52/518 |
| 2013/0180198 A1 | 7/2013 | Olson et al. | |
| 2016/0222656 A1 | 8/2016 | Teng et al. | |
| 2017/0058523 A1 | 3/2017 | Kennedy | |
| 2018/0320370 A1 | 11/2018 | Letts et al. | |
| 2018/0371758 A1 | 12/2018 | Johnson et al. | |
| 2021/0129484 A1 | 5/2021 | Pacanovsky et al. | |
| 2022/0081906 A1 * | 3/2022 | Leitch | E04D 1/30 |
| 2022/0154453 A1 | 5/2022 | Letts et al. | |
| 2022/0275646 A1 | 9/2022 | Jiang et al. | |
| 2023/0064072 A1 | 3/2023 | Jones et al. | |
| 2023/0065390 A1 | 3/2023 | Jones et al. | |
| 2024/0084598 A1 | 3/2024 | Yang | |

\* cited by examiner

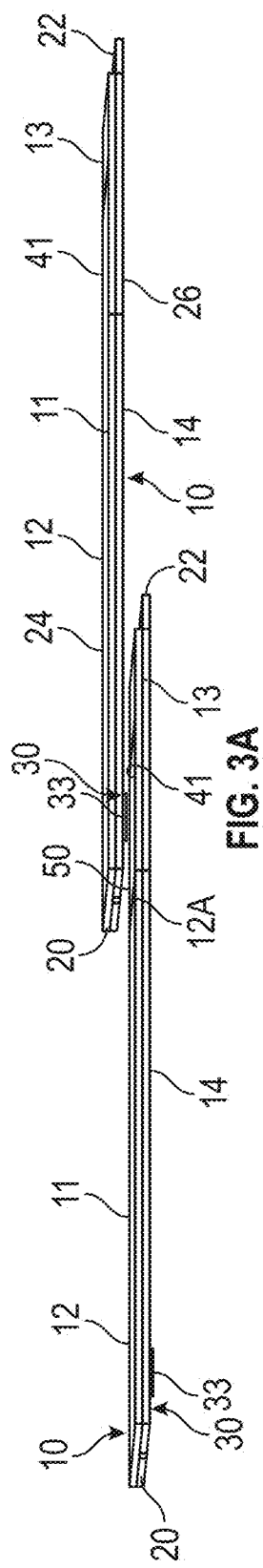
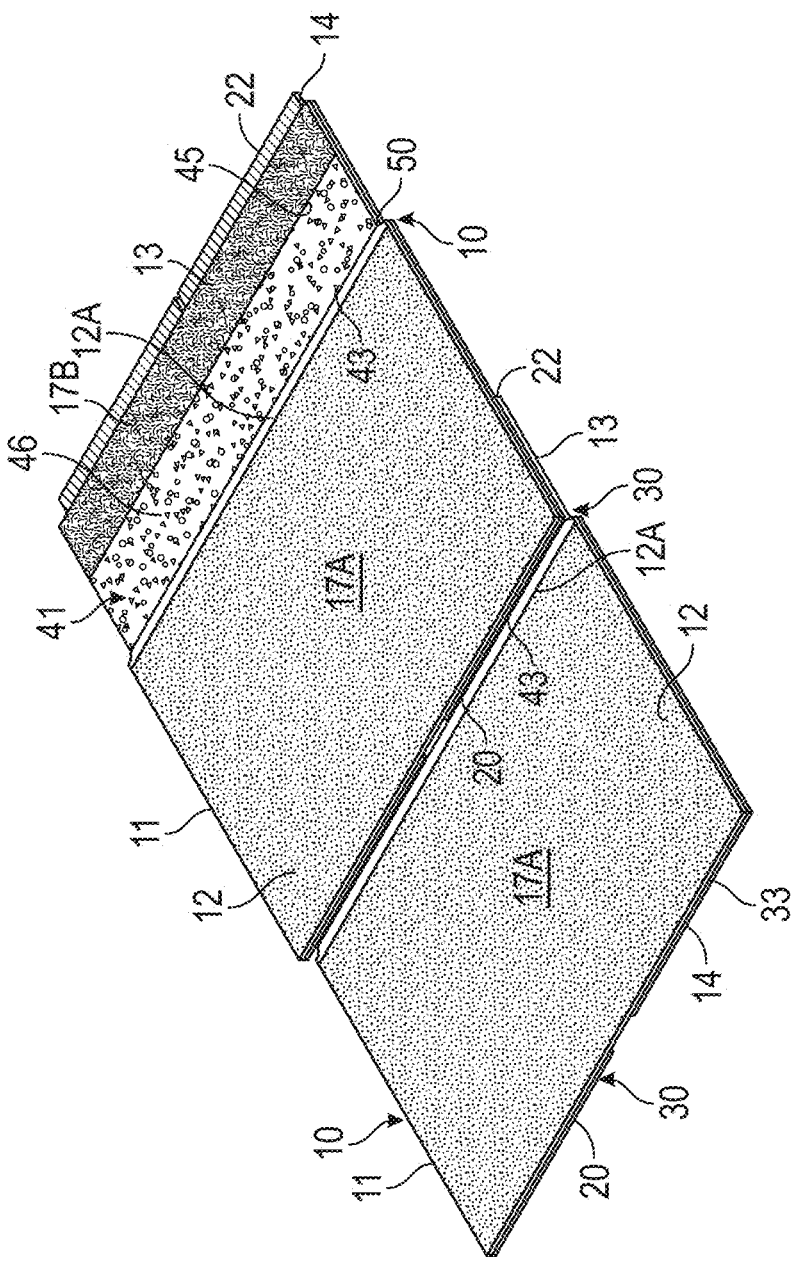

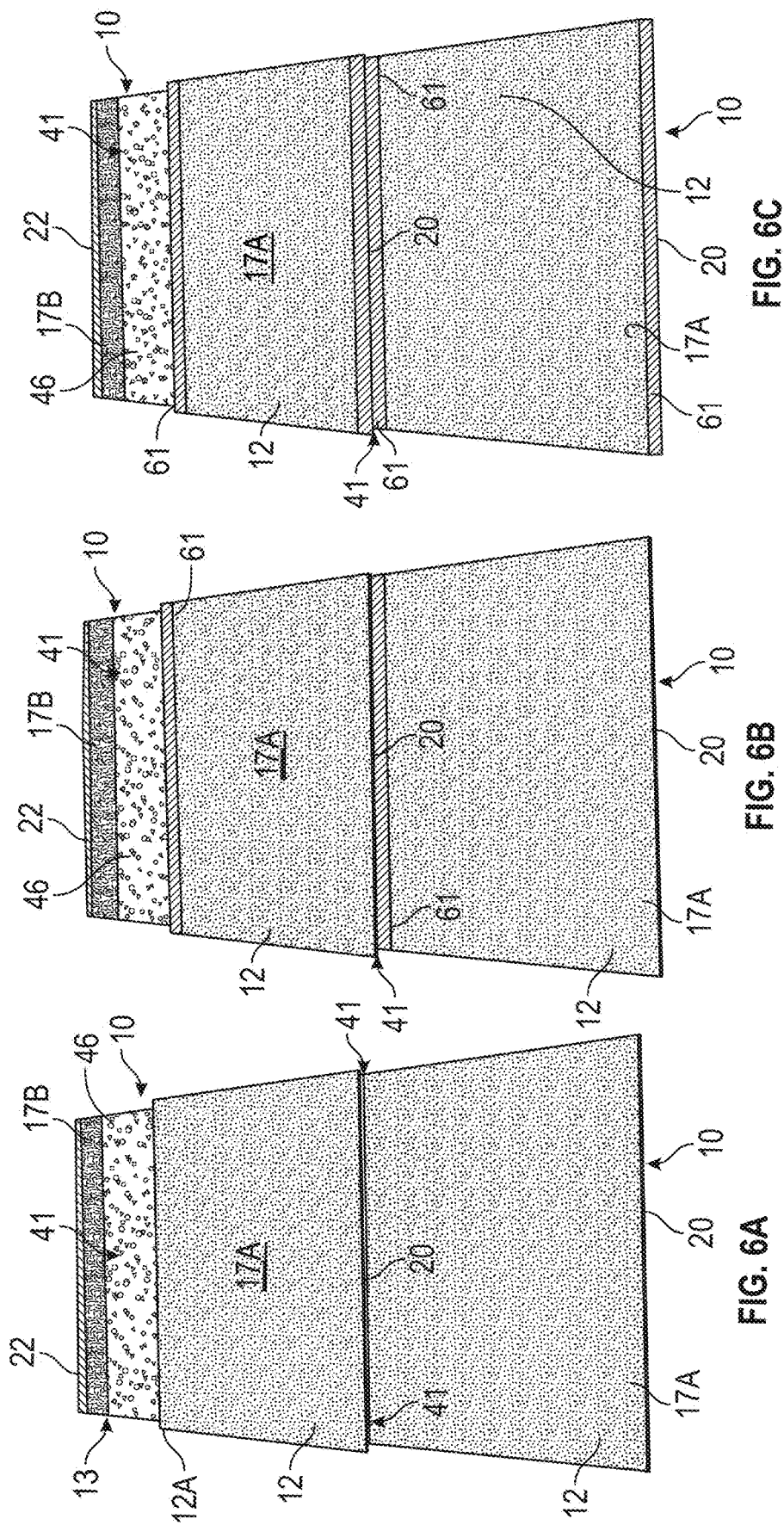

CAP SHINGLES FOR ROOFING SYSTEMS

CROSS-REFERENCE

The present application claims the benefit of U.S. Provisional Application No. 63/453,644, filed on Mar. 21, 2023.

INCORPORATED BY REFERENCE

The disclosures made in U.S. Provisional Application No. 63/453,644, filed Mar. 21, 2023 are specifically incorporated by reference as if set forth in their entireties.

TECHNICAL FIELD

This disclosure relates generally to roofing systems; and in particular to roofing systems having shingles, including cap shingles adapted to fit over a ridge, hip, or cap of a roof, and methods of making such shingles. Other aspects also are described.

BACKGROUND

Cap shingles generally are used in roofing applications along the ridge, hip, or cap areas of a roof where the cap shingles will be exposed to weather, including wind forces, such that it can be seen that a need exists for cap shingles having improved resistance to weather. The present disclosure addresses these and other related and unrelated problems in the art.

SUMMARY

Briefly described, according to one aspect, the present disclosure is directed to roofing systems that, in embodiments, can include roofing materials such as shingles. In embodiments, the roofing materials can comprise cap shingles with features adapted to promote enhanced bonding between adjacent cap shingles when the cap shingles are installed on a ridge, hip, or cap of a roof. In embodiments, the cap shingles are configured to be exposed to weather (e.g. wind, rain, snow, heat, cold, sunlight (including ultraviolet (UV) light, visible light, infrared (IR) light), and hail and other impacts, etc. . . . ), including providing high wind resistance in accordance with ASTM Standards D3161 and D7158/7158M-20 ("ASTM D7158") Standard Test Method for Wind Resistance of Asphalt Shingles (Uplift Force/Uplift Resistance Method), as well as increased mechanical uplift resistance in accordance with ASTM D6381/D6381M-15 ("ASTM D6381") Standard Test Method for Measurement of Asphalt Shingle Mechanical Uplift Resistance.

In embodiments, the cap shingles can be formed from one or more layers of shingle material (e.g., in some embodiments, a woven material, non-woven material, laminated fabric, fiberglass mat, or other suitable materials) that, in embodiments, may be impregnated with an asphalt material, for example, being saturated with an asphalt material and/or being coated with one or more asphaltic coatings along one or more sides thereof. In embodiments, a plurality of granules can be applied to a first surface of the shingle material as a protective and/or aesthetic layer forming an upper surface of the cap shingles that is adapted to be exposed to weather. In some embodiments, the granules can include a first plurality of granules (e.g., headlap granules) that can be applied to the shingle material to form a headlap portion of the cap shingle, and a second plurality of granules (e.g., butt granules) that can be applied to the shingle material to form an exposure portion of the cap shingle.

In embodiments, a sealant attachment zone can be defined along the shingle material between the headlap and exposure portions. In embodiments, the sealant attachment zone can be configured to promote adhesion of adjacent cap shingles when the cap shingles are installed along the ridge, hip, or cap of a roof. In embodiments, a surfacing material can be applied to the surface of the shingle material along at least a portion of the sealant attachment zone. For example, in embodiments, the surfacing material can be applied between the headlap and exposure portions; and in some embodiments, between the butt granules and at least a portion of the headlap granules.

In embodiments, the surfacing material will be configured to promote bonding between the adjacent cap shingles. In some embodiments, no additional surfacing media may be used, and the sealant attachment zone can comprise an area between the headlap and exposure portions where the asphalt coating along the upper surface of the cap shingle is substantially exposed. In some embodiments, a surfacing media can be applied to one or more selected portions of the sealant attachment zone while one or more selected portions of the sealant attachment zone may not include a surfacing media such that other portions of the asphaltic coating along the upper surface of the cap shingle can remain substantially exposed.

In embodiments, a sealant can be applied to a second surface of the shingle material. For example, in some embodiments, the sealant can comprise one or more strips of a self-sealing material, which, strips of self-sealing material can, in embodiments, comprise a plurality of dots, dashes, lines, etc. . . . , of a self-sealing material. In embodiments, the sealant can be applied to the second surface to the shingle material opposite the exposure portion of each cap shingle. In embodiments, the sealant attachment zone can be configured so that when a plurality of cap shingles are positioned in an overlapping arrangement along the ridge, hip or cap of a roof, the sealant of one cap shingle can overlap and be placed into contact with the sealant attachment zone of an adjacent cap shingle installed on along the ridge, hip, or cap of the roof.

In embodiments, the sealant attachment zone can be configured to promote enhanced bonding between the cap shingles, such as by providing substantially direct contact between the sealant of the one cap shingle and the asphaltic coating of the adjacent cap shingle. The enhanced bonding between the cap shingles due to the sealant attachment zone can improve the resistance of the seal or bond created between the cap shingles to weather, including enhanced uplift resistance to wind, when the cap shingles are installed along a ridge, hip or cap of a roof.

In embodiments, a surfacing material can be applied along the sealant attachment zone, and can be selected and/or applied so that at least a portion of the sealant attachment zone is visibly distinct from the headlap granules and the butt granules of the cap shingle such that the sealant attachment zone can function as an alignment guide. For example, in embodiments, the sealant attachment zone can comprise a material adapted to define a highly visible alignment guide configured to help an installer properly align the exposure portion of each subsequently installed cap shingle over the headlap portion of a previously installed cap shingle during installation of the cap shingles.

In some embodiments, the sealant attachment zone further can include a visible indicator adjacent the sealant attachment zone that can function as an alignment guide. For example, in embodiments, an indicator such as a marking line (which can be formed by use of surfacing media of a selected color or which is applied in an amount adapted to create a shading effect), a tape, paint, or other suitable materials with high visibility, or combinations thereof, can be applied along at least a portion of the sealant attachment zone so as to indicate where a front edge of a next cap shingle (e.g. a forward or terminal edge of the exposure portion of the next cap shingle) is to be placed for the cap shingles to be properly aligned during installation.

In exemplary embodiments, the alignment and attachment of the cap shingles with previously installed cap shingles provided by the sealant attachment zone further can be used to facilitate various characteristics of the cap shingles and/or a roof including an installation of the cap shingles, such as, for example, achieving desirable aesthetics, or visual features of the installed cap shingles a proper installation of the cap shingles, and further can provide enhanced bonding together of the cap shingles along the ridge, hip, or cap of a roof so as to provide increased resistance to exposure of the shingle materials to weather, such as high winds, and the efficient use of the shingle materials.

In some embodiments, a surfacing media can be applied to the sealant attachment zone. In embodiments, the surfacing media can be applied in varying thicknesses or amounts, and/or can comprise a material, color, etc. . . . selected to provide shading or other aesthetic effects, such as, for example, providing the appearance of additional depth between the cap shingles after installation. In addition, in embodiments, the surfacing media can comprise a material adapted to cover the portion of asphalt material within the sealant attachment area of a previously installed cap shingle and facilitate formation of an enhanced bond between the asphalt material and the sealant of a next cap shingle installed thereover.

Various aspects and embodiments of shingles, including cap shingles, roofing systems utilizing such shingles, and methods for producing and installing such shingles are provided herein according to the principles of the present disclosure.

According to one aspect, a cap shingle is provided, comprising: at least one layer of shingle material having a front edge, a rear edge, an upper surface having a headlap portion adjacent to the rear edge and an exposure portion adjacent to the front edge, and a lower surface; wherein the at least one layer of shingle material is configured to bend in an arc along an axis extending in a direction from the rear edge to the front edge for installation along a ridge, hip, or cap of a roof; a sealant applied along the lower surface of the at least one layer of shingle material adjacent the front edge; and a sealant attachment zone positioned along the upper surface of the at least one layer of shingle material between the headlap portion and the exposure portion, and including a surfacing media configured to promote adhesion between the upper surface of the cap shingle and the sealant of a next cap shingle; wherein the sealant attachment zone of the cap shingle is configured to contact a sealant applied along a lower surface of the next cap shingle installed along the ridge, hip or cap of the roof.

In embodiments, the cap shingle can further comprise a coating applied to the upper surface of the at least one layer of shingle material; wherein the sealant attachment zone is configured to facilitate bonding between the coating along the upper surface of the at least one layer of shingle material and the sealant of the next cap shingle. In some embodiments, the coating is applied to both the upper and lower surfaces of the at least one layer of shingle material.

In some embodiments of the cap shingle, the coating comprises filled asphalts, polymer modified asphalts; bitumen, PSA, acrylic adhesives, butyl adhesives, or combinations thereof.

In embodiments of the cap shingle, the surfacing media comprises a plurality of particles applied over the asphaltic coating applied to the upper surface of the at least one layer of shingle material along the sealant attachment zone.

In some embodiments of the cap shingle, the surfacing media comprises sand, granule fines, composite particles, stone dust, talc, polymer particles, rubber particles, wax, or combinations thereof.

In some embodiments of the cap shingle, the surfacing media comprises polar polymers, adhesion promoters, tackifiers, or combinations thereof.

In some embodiments of the cap shingle, the sealant attachment zone is configured to define an alignment guide for aligning the front edge of the next cap shingle with the headlap portion of the cap shingle.

In some embodiments, the cap shingle further comprises a paint line, a plurality of particles of a selected color, an area of no granules, or combinations thereof, adapted to define a visible guide for alignment of a front edge of the next cap shingle over the headlap portion of the cap shingle during installation of the cap shingle and the next cap shingle along the ridge, hip or cap of the roof.

In some embodiments, the cap shingle further comprises a plurality of headlap granules along the headlap portion, and a plurality of butt granules along the exposure portion; and wherein the sealant attachment zone comprises a marking line or strip positioned between the headlap granules and the butt granules.

In embodiments, the marking line or strip comprises a plurality of particles, fines, granules, or combinations thereof, of a different or contrasting color or shade to the headlap granules and the butt granules, an area of no granules, or combinations thereof.

In some embodiments of the cap shingle, the sealant comprises a substantially continuous or discontinuous strip of a self-sealing material.

According to another aspect, a shingle is provided, the shingle comprising at least one layer of shingle material including an upper surface having a headlap portion adapted to be overlapped by a next shingle arranged along a ridge, hip or cap of a roof, and an exposure portion; a lower surface opposite the upper surface; front and rear edges; and an asphalt material applied to at least the upper surface; wherein the at least one layer of shingle material is configured to bend in an arc along an axis extending in a direction from the rear edge to the front edge for installation along a ridge, hip, or cap of a roof; a sealant attachment zone positioned along the upper surface of the at least one layer of shingle material between the headlap portion and the exposure portions; and a sealant applied to the lower surface; wherein the sealant attachment zone is configured to promote adhesion between the asphalt material applied to the upper surface of the shingle and a sealant applied along a lower surface of a next shingle installed along the ridge, hip or cap of the roof.

In embodiments, the sealant attachment zone is configured to define an alignment guide for aligning the front edge of the next shingle with the headlap portion of the shingle.

In some embodiments, the sealant attachment zone comprises an application of granules configured to create shading or an appearance of a transition between the headlap and exposure portions of the shingle.

In embodiments, the shingle further comprises an indicator positioned adjacent the sealant attachment zone and configured to assist in aligning the front edge of the next shingle over a previously installed shingle.

In some embodiments, the sealant attachment zone can comprise a paint line, a plurality of particles of a selected color, an area of no granules, an area of exposed asphalt material, or combinations thereof, adapted to define a visible alignment guide for alignment of the front edge of the next shingle over the headlap portion of the shingle during installation of the shingle and the shingle along the ridge, hip or cap of the roof.

In embodiments, the shingle further comprises a plurality of headlap granules along the headlap portion, and a plurality of butt granules along the exposure portion. In some embodiments, the sealant attachment zone comprises a marking line or strip positioned between the headlap granules and the butt granules.

In embodiments the sealant attachment zone can comprise a plurality of particles, fines, granules, or combinations thereof, of a different or contrasting color or shade to the headlap granules and the butt granules, an area of no granules, or combinations thereof, to provide aesthetic features such as shading a marking line, indicator, or combinations thereof.

In embodiments, the shingle, further comprises a surfacing media applied along the sealant attachment zone.

In embodiments, the surfacing media comprises a plurality of particles applied along the sealant attachment zone. In some embodiments of the shingle, the surfacing media comprises sand, granule fines, composite particles, stone dust, talc, polymer particles, rubber particles, wax, or combinations thereof.

In some embodiments, the surfacing media comprises polar polymers, adhesion promoters, tackifiers, or combinations thereof.

In embodiments of the shingle, the sealant comprises at least one substantially continuous or discontinuous strip of a self-sealing material positioned adjacent to the front edge. In embodiments, the at least one substantially continuous or discontinuous strip of a self-sealing material comprises dots, dashes, lines, or a combination thereof, of the self-sealing material.

According to another aspect, a roofing system comprises a plurality of cap shingles positioned along a ridge, hip or cap of a roof, each of the cap shingles comprising an upper surface; a headlap portion and an exposure portion; a lower surface opposite the upper surface; a plurality of peripheral edges, including front and rear edges and side edges; a sealant disposed along the lower surface; and a sealant attachment zone defined along the upper surface between the headlap and exposure portions and comprising a surface configured to promote adhesion between a sealant of a first cap shingle and an upper surface of a second cap shingle; wherein the first and second cap shingles are configured to bend in an arc along an axis extending in a direction from the rear edge to the front edge for installation along the ridge, hip, or cap of the roof; wherein the first cap shingle is installed along the ridge, hip or cap of the roof with an exposure portion of the first cap shingle overlapping a headlap portion of the second cap shingle, and with the front edge of the first cap shingle aligned with a portion of the sealant attachment zone of the second cap shingle, and with the sealant of the first cap shingle contacting the sealant attachment zone of the second cap shingle.

In embodiments, the roofing system further comprises a coating applied to at least the upper surface of the cap shingles. In embodiments, the coating comprises an asphaltic coating. In some embodiments, the coating is further applied to the lower surfaces of the cap shingles.

In embodiments of the roofing system, the cap shingles further comprise a surfacing media applied to the upper surface of each cap shingle along the sealant attachment zone thereof; and wherein the surfacing media is configured to promote adhesion of the sealant of the first cap shingle to the asphaltic coating applied to the upper surface of the second cap shingle.

In embodiments of the roofing system, the surfacing media comprises a plurality of particles configured to cover the asphaltic coating applied to the upper surface along the sealant attachment zone.

In some embodiments of the roofing system, the surfacing media comprises sand, granule fines, composite particles, stone dust, talc, polymer particles, rubber particles, wax, or combinations thereof.

In some embodiments of the roofing system, the surfacing media comprises polar polymers, adhesion promoters, tackifiers, or combinations thereof.

In embodiments of the roofing system, the sealant attachment zone is configured to define an alignment guide for aligning the front edge of the first cap shingle with the headlap portion of the second cap shingle.

In embodiments of the roofing system, at least one of the cap shingles includes a paint line, a plurality of particles of a selected color, an area of no granules, or combinations thereof, adapted to define a visible alignment guide for alignment of the front edge of the first cap shingle over the headlap portion of the second cap shingle during installation of the shingle and the cap shingle along the ridge, hip or cap of the roof.

In embodiments, when the cap shingles are installed along the ridge, hip, or cap of the roof, the cap shingles are configured to resist wind uplift forces from wind speeds of up to 194 mph in accordance with ASTM D7158.

In embodiments, when the cap shingles are installed along the ridge, hip, or cap of the roof, the cap shingles comprise an average mechanical uplift resistance of at least 30 lbf in accordance with ASTM D6831.

In embodiments, the cap shingles comprise a mechanical uplift load resistance of 26 lbf to 35 lbf in accordance with ASTM D6381.

In embodiments, the sealant comprises at least one substantially continuous or discontinuous strip of a self-sealing material. In some embodiments, the at least one substantially continuous or discontinuous strip of a self-sealing material comprises dots, dashes, lines, or a combination thereof.

In embodiments, the sealant comprises at least one substantially continuous or discontinuous strip of a self-sealing material positioned adjacent to the front edge of each cap shingle.

In embodiments of the roofing system, each of the cap shingles further comprises a first plurality of granules applied to the headlap portion; and having a second plurality of granules applied to the exposure portion; and wherein the sealant attachment zone comprises a plurality of particles, fines, granules, or combinations thereof, of a different or contrasting color or shade to the headlap granules and the butt granules.

In still another aspect, a kit is provided, comprising a plurality of cap shingles, each of the cap shingles comprising: a plurality of peripheral edges; an upper surface having an exposure portion and a headlap portion; a lower surface; a sealant applied along the lower surface; and a sealant attachment zone positioned along the upper surface between the exposure and headlap portions; the sealant attachment zone comprising a surfacing media applied therealong; wherein each of the cap shingles is configured to bend in an arc along an axis extending in a longitudinal direction for installation of the cap shingle along a ridge, hip, or cap of a roof; wherein when the cap shingles are installed along the ridge, hip or cap of the roof, the sealant attachment zone of each cap shingle is configured to align with a sealant of a next cap shingle with the sealant attachment zone engaging the sealant so as to promote adhesion between the upper surface of the cap shingle and a sealant of a next cap shingle installed along the ridge, hip or cap of the roof.

In embodiments, the sealant attachment zone is configured to define an alignment guide for aligning a front edge of the next cap shingle with a transition between the headlap and exposure portions of the cap shingle.

In some embodiments, the sealant attachment zone comprises an application of granules configured to create shading or an appearance of a transition between the headlap and exposure portions of the cap shingle.

In embodiments, the cap shingles further comprise an indicator adapted to define a visible alignment guide for alignment of a front edge of the next cap shingle over the headlap portion of the shingle during installation of the next cap shingle along the ridge, hip or cap of the roof.

In some embodiments, the indicator can comprise a paint line, a plurality of particles of a selected color, an area of no granules, or combinations thereof.

In embodiments, the cap shingles further comprise an asphaltic coating applied to the upper and lower surfaces of each cap shingle; and in some embodiments, the surfacing media of the sealant attachment zone comprises a plurality of particles configured to cover the asphaltic coating along the sealant attachment zone.

In some embodiments, the surfacing media comprises sand, granule fines, composite particles, stone dust, talc, polymer particles, rubber particles, wax, or combinations thereof.

In some embodiments, the surfacing media comprises polar polymers, adhesion promoters, tackifiers, or combinations thereof.

In embodiments, the sealant comprises at least one substantially continuous or discontinuous strip of a self-sealing material.

In embodiments, the at least one substantially continuous or discontinuous strip of a self-sealing material comprises dots, dashes, lines, or a combination thereof, of the self-sealing material.

In embodiments, when the cap shingles are installed along the ridge, hip, or cap of the roof, the cap shingles are configured to resist wind uplift forces from wind speeds of up to 194 mph in accordance with ASTM D7158.

According to still another aspect, a method comprises moving a shingle material along a path, the shingle material including an asphaltic coating applied to a surface thereof; applying a first plurality of granules to the surface of the shingle material; applying a second plurality of granules to the surface of the shingle material; forming a sealant attachment zone on the shingle material between the first and second pluralities of granules; applying a sealant to an opposite surface of the shingle material; and cutting the shingle material to form a plurality of cap shingles; wherein each of the cap shingles comprises an upper surface including a headlap portion having the first plurality of granules applied therealong, an exposure portion having the second plurality of granules applied therealong; and a lower surface with a substantially continuous or discontinuous strip of sealant applied thereto; wherein the sealant attachment zone is defined between the headlap and exposure portions; wherein each of the cap shingles is configured to bend about an arc along an axis extending in a direction from a front edge to a rear edge of each cap shingle for installation of the cap shingles along a ridge, hip or cap of a roof; and wherein the sealant attachment zone comprises an area along the upper surface of each cap shingle configured to provide increased surface contact between the asphaltic coating along the upper surface of each cap shingle and a sealant applied along the lower surface of a next cap shingle when the cap shingle and next cap shingle are installed along the ridge, hip or cap of the roof.

In embodiments, the sealant attachment zone can be configured to define an alignment guide for aligning the front edge of a first cap shingle with the headlap portion of a second cap shingle installed thereover.

In embodiments, forming the sealant attachment zone comprises applying the first and second pluralities of granules at different portions or at different intervals as the shingle material is moved along the path.

In embodiments, forming the sealant attachment zone comprises applying a surfacing media along the shingle material between the first and second granules, wherein the surfacing media is configured to promote adhesion between the asphaltic coating applied along the upper surface of the cap shingle and the sealant applied along the lower surface of the next cap shingle.

In embodiments, the method can further comprise applying a marking line or indictor adjacent the sealant attachment zone so as to form an alignment guide.

In embodiments, forming the sealant attachment zone comprises applying a surface media to the upper surface of the shingle, wherein the surface media is applied to create an aesthetic effect when the next shingle is installed over a previously installed cap shingle.

Accordingly, embodiments of shingles, and in particular cap shingles configured to fit over a ridge, hip or cap of a roof; roofing systems, kits for assembly of a roof, and methods for forming shingles, such as cap shingles, that are directed to the above discussed and other aspects are disclosed. The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 3A is a perspective side view of two aligned cap shingles according to embodiments of the present disclosure.

FIG. 3B is a perspective top view of the aligned cap shingles of FIG. 3A.

FIGS. 6A-6C are views of cap shingles with different aesthetic features according to principles of the present disclosure.

DETAILED DESCRIPTION

The embodiments of the present disclosure will now be described in more detail with reference to the attached drawing figures.

FIGS. 1A-6C show embodiments of shingles, including cap shingles, to roofing systems employing shingles such cap shingles, and methods of forming cap shingles according to the present disclosure.

Figure 1A:
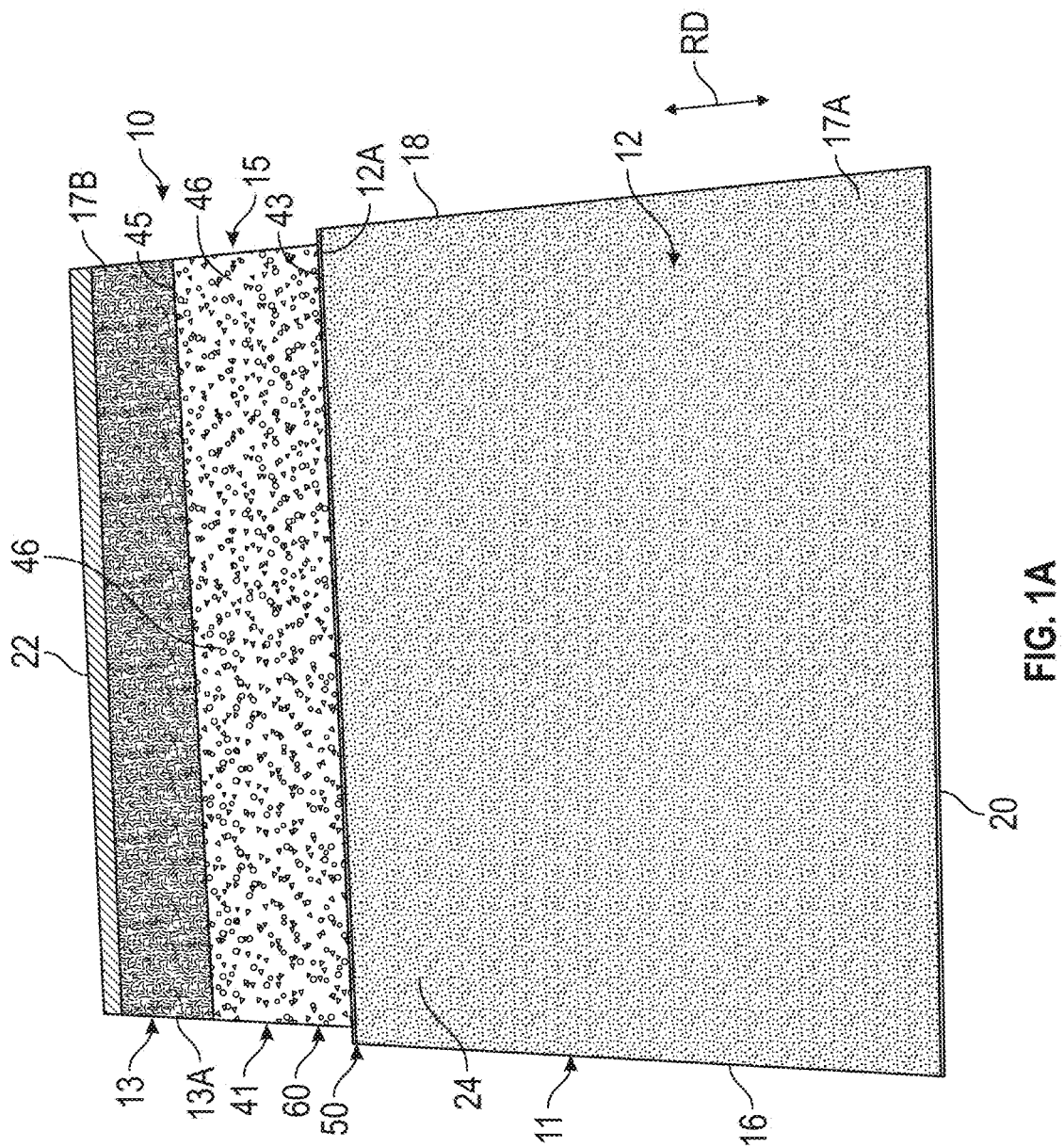
FIGS. 1A and 1B are views of a cap shingle according to embodiments of the present disclosure.

FIG. 1A is a top view showing an example embodiment of a shingle, for example a ridge, hip, or cap shingle 10, manufactured according to principles of the present disclosure. In embodiments, the cap shingle 10 can include one or more layers of a shingle material. For example, in some embodiments, the cap shingle 10 can comprise a laminated structure including a first or top layer 11 of a shingle material, along which an exposure portion 12 and a headlap portion 13 are defined; and a second or bottom layer 14 of shingle material (FIGS. 1B and 3A) that is attached to the top layer 11 (e.g., by adhesives, welding, etc. . . . ) to form the multi-layer cap shingle 10.

Figure 2:
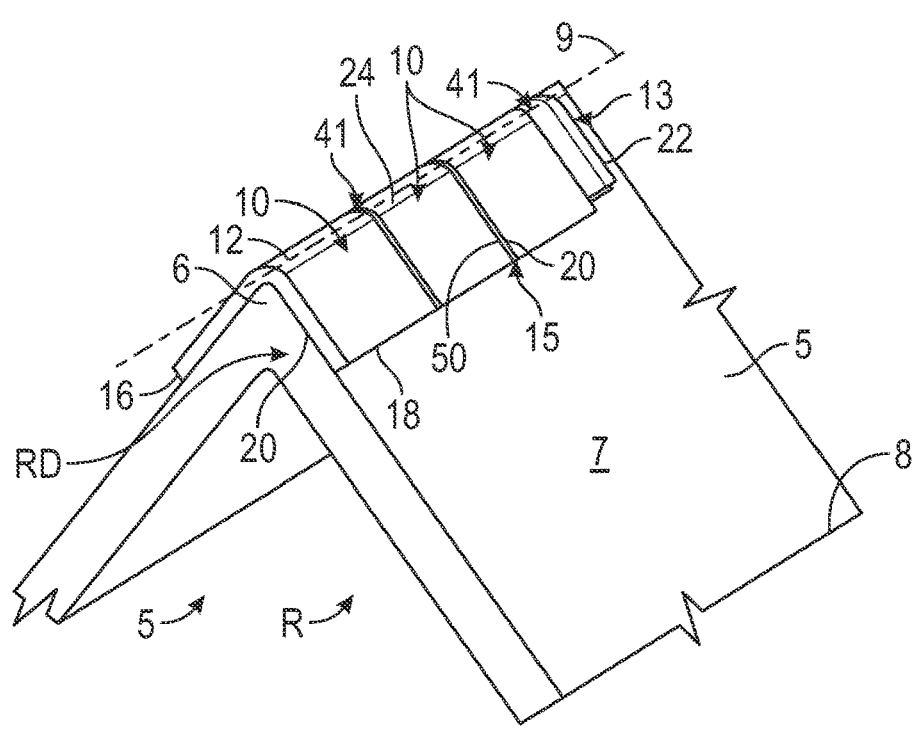
FIG. 2 schematically shows the cap shingle of FIGS. 1A and 1B applied along a ridge, hip, or cap of a roof according to embodiments of the present disclosure.

As shown in FIG. 2, in embodiments, the cap shingles 10 can be configured for installation on a roof R, in particular being positioned over and along a ridge 6, hip or cap of the roof R as part of a roofing system 5. It will also be understood that the roofing system 5 may include other roofing materials, including, but not limited to, other types of shingles, roofing membranes, tiles, decking materials.

In embodiments, the cap shingles 10 illustrated in the figures are configured to be positioned over a roof deck 7 or roofing substrate of the roof. In embodiments, the roof deck can include sheathing, wood, oriented strand board, or other decking materials. In addition, in embodiments, a plurality of shingles, tiles, panels, roofing membranes, an underlayment, or other roofing material, or combinations thereof, can be applied along the roof deck, In embodiments, the cap shingles will be configured to be installed along a ridge, hip or cap of a roof such as by being placed along and over the ridge 6, hip or cap of the roof R, arranged in an overlapping relationship along a ridgeline direction RD of the roof, and with first and second side edges 16 and 18 of the cap shingles 10 extending over an upper surface 8 of the roof deck 7 of the roof. In embodiments, such as indicated in FIG. 2, the cap shingles can be bent in an arc along a longitudinal axis 9 extending in the ridgeline direction RD of the roof for installation over the ridge 6, hip, or cap of the roof. The cap shingles can be secured to the roof deck 7, to adjacent cap shingles, and/or to other roofing materials, such as adjacent roofing shingles, tiles, panels, roofing membranes, an underlayment, decking materials, or combinations thereof, by adhesives or sealant materials, mechanical attachments such as fasteners, connectors, or other attachments, or combinations thereof.

In embodiments, the roof R, such as shown in FIG. 2, can be configured to form a sloped roof (e.g., such as a residential roof), with the roof deck 7 thereof having a slope or pitch of Y:X. For example, in some embodiments, the roof can include a steep slope roof having a slope in a ratio of 4:12 to 12:12, where Y corresponds to the "rise" of the roof, and where X corresponds to the "run" of the roof. In some embodiments, the roof can have a slope in a ratio of 5:12 to 12:12; 6:12 to 12:12; 7:12 to 12:12; 8:12 to 12:12; 9:12 to 12:12; 10:12 to 12:12; or 11:12 to 12:12. Other slopes also can be provided.

In other embodiments, the roof deck 7 can be configured to form a lower slope roof, including a low slope roof having a slope or pitch in a ratio of less than 4:12; less than 3:12; less than 2:12; less than 1:12; or in a ratio of 1:12 to 4:12; a ratio of 1:12 to 3:12; a ratio of 1:12 to 2:12; a ratio of 2:12 to 4:12; a ratio of 2:12 to 3:12; or a ratio of 3:12 to 4:12. Other slopes also can be provided.

As shown in FIG. 2, in an example embodiment, the roof R can have a ridge 6, hip, or cap that extends along the roof in a ridgeline direction along which a plurality of cap shingles 10 can be positioned, and with the roof deck 7 extending downwardly at an angle from the ridge 6 to an eave 8 of the roof. The roof further generally will include a plurality of roofing shingles 5 applied over and covering the roof deck 7. In some embodiments, the roof R also could include features such as, dormers, gables, and/or other features. In other embodiments, the roof R could be any suitable style of roof, including a roof configured with one or more ridges and/or one or more hips.

Figure 1B:
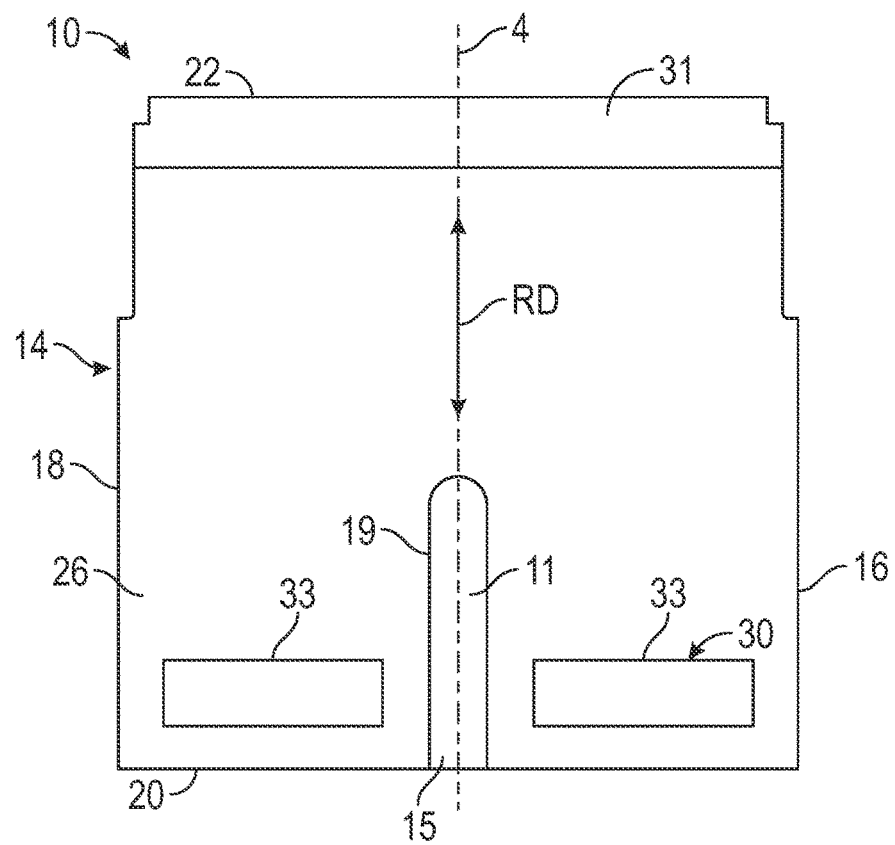

In embodiments, the shingles can comprise cap shingles 10 such as shown in FIGS. 1A and 1B, where the cap shingles are configured to withstand exposure to weather, including exposure to wind, rain, snow, extreme temperatures (e.g., above 100° F.) and extreme cold (e.g., below 0° F.). The cap shingles, when installed along a ridge hip or cap of a roof, will be configured with increased wind resistance sufficient to withstand wind uplift forces from high wind speeds of up to 116 mph [187 km/h] (Class D in ASTM D7158); in some embodiments, the cap shingles will be configured with increased wind resistance sufficient to withstand wind uplift forces from high wind speeds of up to 155 mph [249 km/h] (Class G in ASTM D7158); and in other embodiments, the cap shingles will be configured with increased wind resistance sufficient to withstand wind uplift forces from high wind speeds of up to 194 mph [312 km/h] (Class H in ASTM D7158), when tested in accordance with ASTM D3161 (the Standard Test Method for Wind Resistance of Steep Slope Roofing Products (Fan-Induced Method)) and/or ASTM D7158 (the Standard Test Method for Wind Resistance of Sealed Asphalt Shingles (Uplift Force/Uplift Resistance Method).

In addition, in embodiments, the cap shingles can have an increased mechanical uplift resistance measured in accordance with ASTM D6381. For example, in embodiments, when installed along a ridge, hip or cap of a roof, as shown in FIG. 2, the cap shingles can have a maximum load mechanical uplift resistance that is greater than 20 lbf, and in embodiments, can have a maximum load mechanical uplift resistance of 26 lbf to 38 lbf and an average maximum load mechanical uplift resistance of 27 lbf to 32 lbf.

In embodiments, the cap shingles can have a maximum load mechanical uplift resistance of 22 lbf to 40 lbf, 22 lbf to 39 lbf, 22 lbf to 38 lbf, 22 lbf to 37 lbf, 22 lbf to 36 lbf, 22 lbf to 35 lbf, 22 lbf to 34 lbf, 22 lbf to 33 lbf, 22 lbf to 32 lbf, 22 lbf to 31 lbf, 22 lbf to 30 lbf, 22 lbf to 29 lbf, 22 lbf to 28 lbf, 22 lbf to 27 lbf, 22 lbf to 26 lbf, 22 lbf to 25 lbf, 22 lbf to 24 lbf, 22 lbf to 23 lbf, 23 lbf to 40 lbf, 23 lbf to 39 lbf, 23 lbf to 38 lbf, 23 lbf to 37 lbf, 23 lbf to 36 lbf, 23 lbf to 35 lbf, 23 lbf to 34 lbf, 23 lbf to 33 lbf, 23 lbf to 32 lbf, 23 lbf to 31 lbf, 23 lbf to 30 lbf, 23 lbf to 29 lbf, 23 lbf to 28 lbf, 23 lbf to 27 lbf, 23 lbf to 26 lbf, 23 lbf to 25 lbf, 23 lbf to 24 lbf, 24 lbf to 40 lbf, 24 lbf to 39 lbf, 24 lbf to 38 lbf, 24 lbf to 37 lbf, 24 lbf to 36 lbf, 24 lbf to 35 lbf, 24 lbf to 34 lbf, 24 lbf to 33 lbf, 24 lbf to 32 lbf, 24 lbf to 31 lbf, 24 lbf to 30 lbf, 24 lbf to 29 lbf, 24 lbf to 28 lbf, 24 lbf to 27 lbf, 24 lbf to 26 lbf, 24 lbf to 25 lbf, 25 lbf to 40 lbf, 25 lbf to 39 lbf, 25 lbf to 38 lbf, 25 lbf to 37 lbf, 25 lbf to 36 lbf, 25 lbf to 35 lbf, 25 lbf to 34 lbf, 25 lbf to 33 lbf, 25 lbf to 32 lbf, 25 lbf to 31 lbf, 25 lbf to 30 lbf, 25 lbf to 29 lbf, 25 lbf to 28 lbf, 25 lbf to 27 lbf, 25 lbf to 26 lbf, 26 lbf to 40 lbf, 26 lbf to 39 lbf, 26 lbf to 38 lbf, 26 lbf to 37 lbf, 26 lbf to 36 lbf, 26 lbf to 35 lbf, 26 lbf to 34 lbf, 26 lbf to 33 lbf, 26 lbf to 32 lbf, 26 lbf to 31 lbf, 26 lbf to 30 lbf, 26 lbf to 29 lbf, 26 lbf to 28 lbf, 26 lbf to 27 lbf, 27 lbf to 40 lbf, 27 lbf to 39 lbf, 27 lbf to 38 lbf, 27 lbf to 37 lbf, 27 lbf to 36 lbf, 27 lbf to 35 lbf, 27 lbf to 34 lbf, 27 lbf to 33 lbf, 27 lbf to 32 lbf, 27 lbf to 31 lbf, 27 lbf to 30 lbf, 27 lbf to 29 lbf, 27 lbf to 28 lbf, 28 lbf to 40 lbf, 28 lbf to 39 lbf, 28 lbf to 38 lbf, 28 lbf to 37 lbf, 28 lbf to 36 lbf, 28 lbf to 35 lbf, 28 lbf to 34 lbf, 28 lbf to 33 lbf, 28 lbf to 32 lbf, 28 lbf to 31 lbf, 28 lbf to 30 lbf, 28 lbf to 29 lbf, 29 lbf to 40 lbf, 29 lbf to 39 lbf, 29 lbf to 38 lbf, 29 lbf to 37 lbf, 29 lbf to 36 lbf, 29 lbf to 35 lbf, 29 lbf to 34 lbf, 29 lbf to 33 lbf, 29 lbf to 32 lbf, 29 lbf to 31 lbf, 29 lbf to 30 lbf, 30 lbf to 40 lbf, 30 lbf to 39 lbf, 30 lbf to 38 lbf, 30 lbf to 37 lbf, 30 lbf to 36 lbf, 30 lbf to 35 lbf, 30 lbf to 34 lbf, 30 lbf to 33 lbf, 30 lbf to 32 lbf, 30 lbf to 31 lbf, 31 lbf to 40 lbf, 31 lbf to 39 lbf, 31 lbf to 38 lbf, 31 lbf to 37 lbf, 31 lbf to 36 lbf, 31 lbf to 35 lbf, 31 lbf to 34 lbf, 31 lbf to 33 lbf, 31 lbf to 32 lbf, 32 lbf to 40 lbf, 32 lbf to 39 lbf, 32 lbf to 38 lbf, 32 lbf to 37 lbf, 32 lbf to 36 lbf, 32 lbf to 35 lbf, 32 lbf to 34 lbf, 32 lbf to 33 lbf, 33 lbf to 40 lbf, 33 lbf to 39 lbf, 33 lbf to 38 lbf, 33 lbf to 37 lbf, 33 lbf to 36 lbf, 33 lbf to 35 lbf, 33 lbf to 34 lbf, 34 lbf to 40 lbf, 34 lbf to 39 lbf, 34 lbf to 38 lbf, 34 lbf to 37 lbf, 34 lbf to 36 lbf, 34 lbf to 35 lbf, 35 lbf to 40 lbf, 35 lbf to 39 lbf, 35 lbf to 38 lbf, 35 lbf to 37 lbf, 35 lbf to 36 lbf, 36 lbf to 40 lbf, 36 lbf to 39 lbf, 36 lbf to 38 lbf, 36 lbf to 37 lbf, 37 lbf to 40 lbf, 37 lbf to 39 lbf, 37 lbf to 38 lbf, 38 lbf to 40 lbf, 38 lbf to 39 lbf, or 39 lbf to 40 lbf.

In embodiments, each cap shingle 10 includes at least one layer of shingle material and can include a coating 15 (FIG. 1B) that can comprise an asphalt material applied to at least one surface of the shingle material. In some embodiments, the cap shingle 10 can be made with a single layer fabric; and in other embodiments, the cap shingle 10 can be made with more than one layer, e.g., including a first layer of shingle material and with a second layer of shingle material. In embodiments, the cap shingle also can include additional layers applied to the first or second layer. For example, the cap shingles 10 can include a laminated, double-layer fabric shingle material.

As further indicated in FIGS. 1A and 1B, in embodiments, the cap shingle 10 can have a plurality of peripheral edges, including a first side edge 16, a second side edge 18, a front edge 20, and a back edge 22. The cap shingle 10 further can include an upper surface 24 (FIG. 1A) with the exposure portion 12 and the headlap portion 13 defined therealong, and a lower surface 26 opposite the upper surface. In embodiments, the upper surface 24 of the cap shingle can have a granulated surface or appearance. For example, in embodiments, the upper surface 24 of the cap shingle 10 can include a plurality of protective granules applied along at least a part of the upper surface of each cap shingle. In embodiments, a plurality of granules can be applied along the headlap and exposure portions of each cap shingle. In embodiments, a first plurality of granules can be applied to the exposure portion 12 (e.g., butt granules 17A), and can be different (e.g., different in size, color, reflectivity, cost etc.) from a second plurality of granules (e.g., headlap granules 17B) applied to the headlap portion 13. In embodiments the granules applied to the headlap and exposure portions can be the same; and in some embodiments the granules can be applied to the headlap portion 13 and exposure portion in different amounts.

In some embodiments, the upper surface of each cap shingle also can incorporate additional materials for protection against exposure to weather (e.g., wind, rain, snow, heat, cold, sunlight (including ultraviolet (UV) light, visible light, infrared (IR) light), hail and other impacts, etc. . . . ), and/or to provide an aesthetic appearance. In embodiments, the headlap portion 13 will be adjacent or proximate the back edge 22 of the cap shingle, and can be configured to be overlapped by at least one additional cap shingle 10 or other roofing shingle arranged along the roof, e.g., by an exposure portion 12 of a next or adjacent cap shingle, the exposure portion of each cap shingle being configured to be exposed to weather.

FIG. 1B is a view of an embodiment of a bottom layer 14 of a cap shingle 10 of FIG. 1A. In this example embodiment, as shown in in FIG. 1B, the bottom layer 14 can include a slot 19 extending from its front edge 20 rearward along a lower surface 26 of the cap shingle. The slot 19 can act as a deformation mechanism that is configured to enable deformation and flexing of the bottom layer 14 of the cap shingle as the cap shingle is bent along it longitudinal axis 9 extending in the ridgeline direction RD (FIG. 2) of the roof for fitting over the ridge, hip or cap of the roof. In embodiments, the slot 19 can enable the bottom layer to narrow as the cap shingle 10 is bent around a ridge, hip, or cap of the roof to help maintain an alignment of the side edges of the layers of the cap shingle 10. The bottom layer 14 could be otherwise configured without departing from the present disclosure.

In embodiments, a sealant 30 can be applied along the lower surface 26 of each cap shingle. For example, in embodiments, the sealant 30 can be positioned adjacent the forward edge 20 of the cap shingle. In addition, in embodiments, a releasable covering material, such as a release tape 31 or other, similar material, can be applied along the bottom layer 14 adjacent the rear edge 22 of the cap shingle, the releasable covering material being configured to cover and protect the sealant when the cap shingles are stacked and prior to installation.

In embodiments, the sealant 30 can comprise one or more strips 33 of a self-sealing material that, in embodiments as shown in FIG. 1B, can be applied along the bottom layer 14 adjacent the front or forward edge 20 of the cap shingle. In some embodiments, the strips 33 of self-sealing material can include dashes, dots, continuous or discontinuous lines of sealant material or combinations thereof. In addition, in embodiments, the strips 33 of self-sealing material can be applied in various patterns; for example, using different combinations and/or arrangements of sealant, with gaps or spaces, such as to enable drainage of moisture. Still further, in some embodiments, different sealant materials, including sealant materials with different properties, can be used.

In embodiments, the strips 33 of self-sealing material further will be configured to adhere the cap shingle 10 to an underlying cap shingle (e.g., along the sealant attachment zone of the underlying cap shingle) when installed on a roof. For example, the one or more strips 33 of self-sealing material can be applied along the bottom layer 14 in positions near the front or forward edge 20 of the bottom layer 14 to adhere the cap shingle 10 to the headlap portion 13 of an adjacent underlying cap shingle 10 (FIGS. 3A-4B). In some embodiments, the one or more strips 33 of self-sealing material also can be applied at other locations along the lower surface 14. According to embodiments, the strips 33 of self-sealing sealant material can include sealing materials that can be activated by pressure, ambient and/or solar heating and/or by other factors.

In exemplary embodiments, the cap shingles 10 can be stacked for storage, transportation, etc. in bundles or pairs arranged to facilitate even stacking of the cap shingles. For example, the cap shingles 10 can be arranged with the lower surfaces 26 thereof facing one another (e.g., back to back) and with opposing orientations (e.g., so that the front edge 20 of one cap shingle 10 is generally aligned with the rear edge 22 of another cap shingle 10). The strip of releasable material of one cap shingle 10 can be aligned with the sealant 30 of an adjacent cap shingle 10 in each pair of cap shingles of the stack so that the strip 31 of releasable covering material can protect the sealant 30 of the adjacent cap shingle and can help prevent bonding between the paired cap shingles during storage, transportation, etc. Accordingly, this arrangement of cap shingles 10 is adapted to provide for easy release of the cap shingles from their stacked arrangement in the bundle.

Figure 4A:
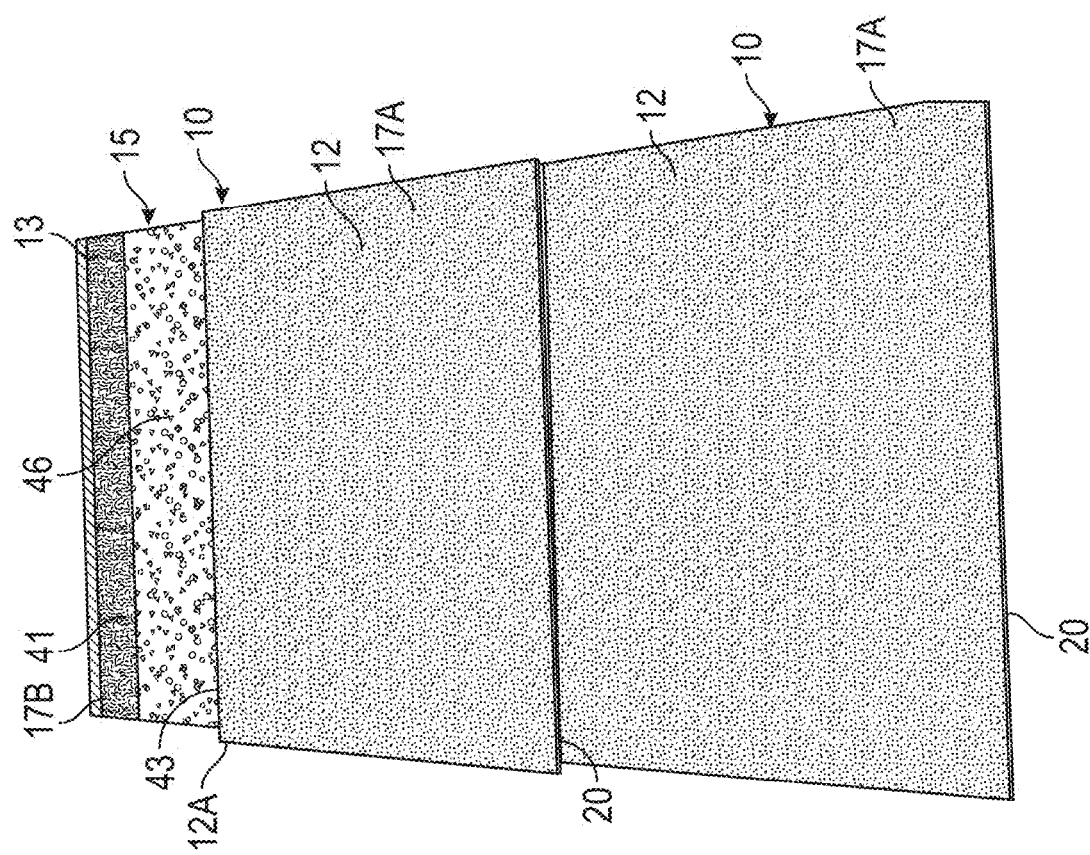
FIGS. 4A and 4B are views showing the aligning and assembling of two cap shingles according to embodiments of the present disclosure.
Figure 4B:
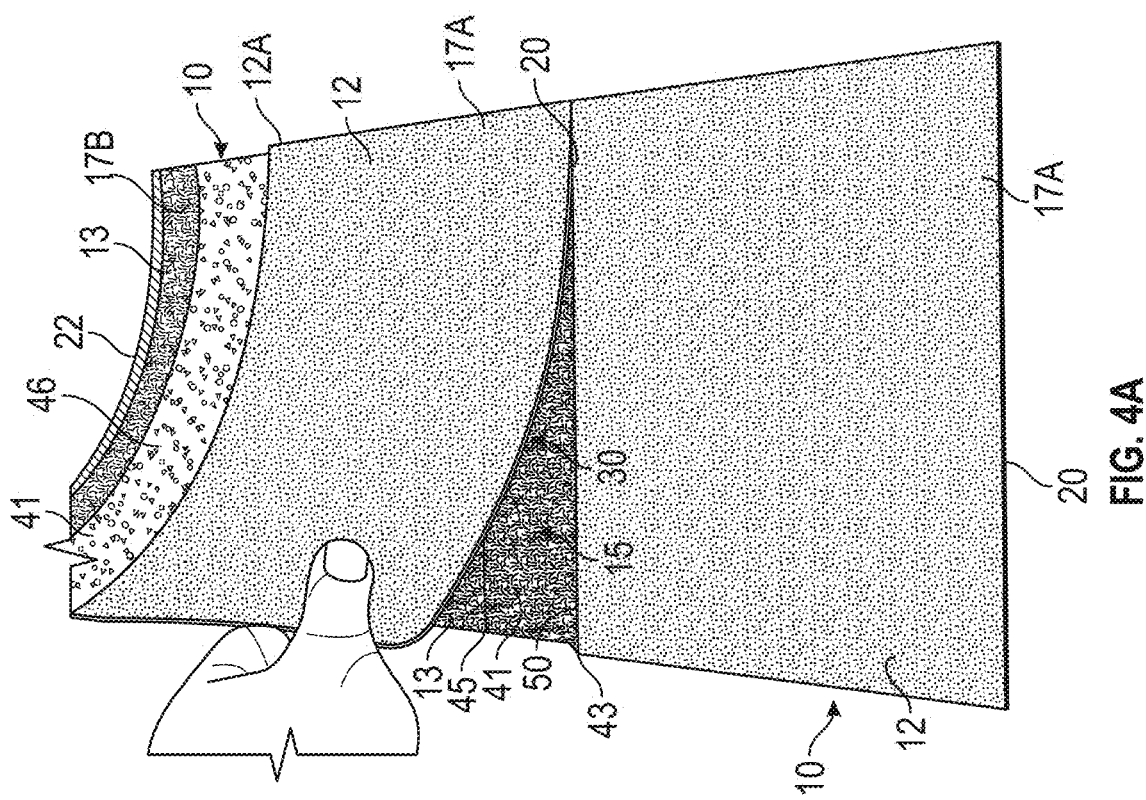

As shown in FIGS. 1A, 3B, and 4A, in embodiments, a sealant attachment zone 41 can be formed along the upper surface of the cap shingle 10 between the headlap and exposure portions. For example, in embodiments, the sealant attachment zone 41 can be positioned in front of the headlap portion 13 along and/or proximate to the exposure portion 12. In embodiments, the sealant attachment zone 41 can extend from the first side edge 16 toward the second side edge 18 of the cap shingle (e.g., transverse to the ridgeline direction RD (FIGS. 1A and 2) substantially across the width of the cap shingle 10.

In the illustrated embodiments, the sealant attachment zone 41 (FIGS. 1A and 4B) can have a front edge 43 and a rear edge 45. In embodiments, the front edge 43 can extend along and/or proximate to the exposure portion 12 (e.g., along a rear edge 12A thereof), and the rear edge 45 can be spaced from the exposure portion 12 and from the rear edge 22 of the cap shingle 10, and can define a forward edge 13A of the headlap portion 13. Alternatively, the sealant attachment zone 41 could be otherwise located adjacent or along the headlap portion 13 without departing from the disclosure. In embodiments, the sealant attachment zone 41 can be considered to be positioned between the headlap portion 13 and the exposure portion 12.

In exemplary embodiments, the sealant attachment zone 41 can be configured for promoting more direct bonding between the sealant 30 (e.g., the strips 33 of self-sealing sealant material) of an adjacent overlapping cap shingle 10A (FIGS. 2-4B) and the asphaltic coating along the upper surface of the cap shingle 10. In embodiments, the sealant attachment zone 41 can include a surfacing media 46 configured to promote adhesion between the upper surface 24 of the cap shingle 10 and the sealant of a next cap shingle installed along the ridge, hip, or cap of the roof. For example, in embodiments, the surfacing media 46 can include various materials selected to help increase the contact area between the strips 33 of self-sealing sealant material of an overlapping cap shingle 10A and the asphalt coating 15 of the adjacent overlapped cap shingle 10 during installation of the cap shingles along the ridge, hip, or cap of a roof. In embodiments, the sealant attachment zone 41 is configured to facilitate a substantially direct asphalt to asphalt contact and enhanced adhesion between cap shingles 10, and can provide increased asphalt to asphalt bonding between cap shingles 10 when installed.

In exemplary embodiments, the surfacing media 46 can include a plurality of particles applied over the asphaltic coating applied the upper surface 24 of the at least one layer of shingle material along the sealant attachment zone 41. In embodiments, the particles of the surfacing media 46 can be suitable to provide sufficient surface coverage of the asphaltic coating of the top layer of shingle material 11 along the sealant attachment zone 41 so as to help reduce or substantially eliminate sticking of the sealant attachment zone 41 to other surfaces during manufacturing, transportation, storage, etc. of the cap shingle 10. The surfacing media 46 of the sealant attachment zone thus generally will comprise a material selected to at least partially cover and protect an exposed portion of the asphaltic coating of the cap shingles along the sealant attachment zone, but which also will be adapted to facilitate a more direct engagement between the asphalt coating along the upper surface of a first or previously installed cap shingle and the sealant of a second or next cap shingle being installed thereover.

Figure 5C:
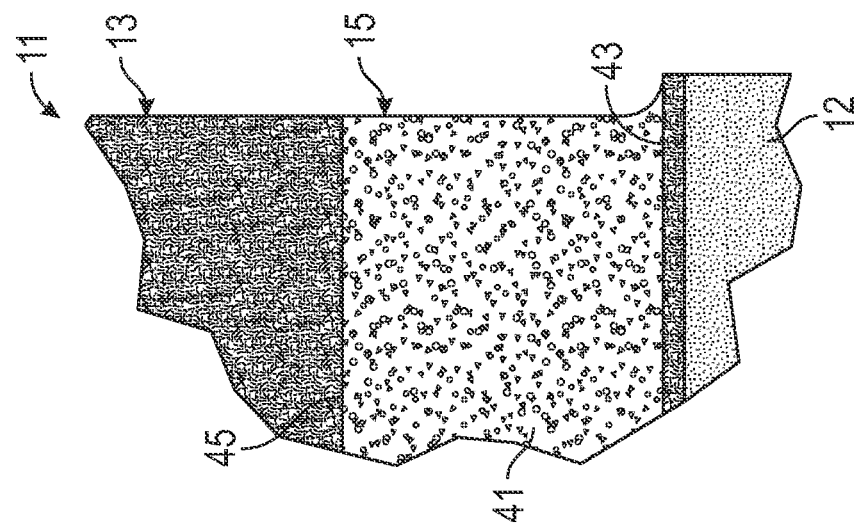
FIG. 5C is a detail view of a portion of the sheet of FIG. 5A as indicated by line 5C in FIG. 5A.

In embodiments, the sealant attachment zone 41 will comprise a size (e.g., a length and a width) configured to provide an increased contact area of the asphaltic coating of the cap shingle 10 adjacent the headlap portion 13 thereof to enhance more direct engagement and promote adhesion between the sealant (e.g., strips 33 of self-sealing material) of an overlapping cap shingle and the asphalt in the sealant attachment zone 41 when the cap shingles 10 are installed on a roof. In embodiments, the sealant attachment zone 41 can extend across a selected portion of the upper surface of the cap shingle, and in some embodiments can be formed in one or more sections across the upper surface of the cap shingle. Still further, in some embodiments, the sealant attachment zone can have a width (in the lateral direction across the cap shingle) that is substantially the same as the headlap portion of the cap shingle (e.g., as shown in FIGS. 1A, 3B and 5A), and a length (in the longitudinal direction along the cap shingle) of 1 inch to $1^{5/16^{th}}$ inches.

In addition, in embodiments, the sealant attachment zone can have a length of 1 inch to 3 inches, 1 inch to $2^{15/16^{th}}$ inches, 1 inch to $2^{7/8^{th}}$ inches, 1 inch to $2^{13/16^{th}}$ inches, 1 inch to $2^{3/4^{th}}$ inches, 1 inch to $2^{11/16^{th}}$ inches, 1 inch to $2^{5/8^{th}}$ inches, 1 inch to $2^{9/16^{th}}$ inches, 1 inch to $2^{1/2}$ inches, 1 inch to $2^{7/16^{th}}$ inches, 1 inch to $2^{3/8^{th}}$ inches, 1 inch to $2^{5/16^{th}}$ inches, 1 inch to $2^{1/4^{th}}$ inches, 1 inch to $2^{1/8^{th}}$ inches, 1 inch to $2^{1/16^{th}}$ inches, 1 inch to 2 inches, 1 inch to $1^{15/16^{th}}$ inches, 1 inch to $1^{7/8^{th}}$ inches, 1 inch to $1^{13/16^{th}}$ inches, 1 inch to $1^{3/4^{th}}$ inches, 1 inch to $1^{11/16^{th}}$ inches, 1 inch to $1^{5/8^{th}}$ inches, 1 inch to $1^{9/16^{th}}$ inches, 1 inch to $1^{1/2}$ inches, 1 inch to $1^{7/16^{th}}$ inches, 1 inch to $1^{3/8^{th}}$ inches, 1 inch to $1^{5/16^{th}}$ inches, 1 inch to $1^{1/4^{th}}$ inches, 1 inch to $1^{3/16^{th}}$ inches, 1 inch to $1^{1/8^{th}}$ inches, 1 inch to $1^{1/16^{th}}$ inches, $1^{1/16^{th}}$ inches to 3 inches, $1^{1/16^{th}}$ inches to $2^{15/16^{th}}$ inches, $1^{1/16^{th}}$ inches to $2^{7/8^{th}}$ inches, $1^{1/16^{th}}$ inches to $2^{13}/_{16}{}^{th}$ inches, $1^{1}/_{16}{}^{th}$ inches to $2^{3}/_{4}{}^{th}$ inches, $1^{1}/_{16}{}^{th}$ inches to $2^{11}/_{16}{}^{th}$ inches, $1^{1}/_{16}{}^{th}$ inches to $2^{5}/_{8}{}^{th}$ inches, $1^{1}/_{16}{}^{th}$ inches to $2^{9}/_{16}{}^{th}$ inches, $1^{1}/_{16}{}^{th}$ inches to $2^{1}/_{2}$ inches, $1^{1}/_{16}{}^{th}$ inches to $2^{7}/_{16}{}^{th}$ inches, $1^{1}/_{16}{}^{th}$ inches to $2^{3}/_{8}{}^{th}$ inches, $1^{1}/_{16}{}^{th}$ inches to $2^{5}/_{16}{}^{th}$ inches, $1^{1}/_{16}{}^{th}$ inches to $2^{1}/_{4}{}^{th}$ inches, $1^{1}/_{16}{}^{th}$ inches to $2^{1}/_{8}{}^{th}$ inches, $1^{1}/_{16}{}^{th}$ inches to $2^{1}/_{16}{}^{th}$ inches, $1^{1}/_{16}{}^{th}$ inches to 2 inches, $1^{1}/_{16}{}^{th}$ inches to $1^{15}/_{16}{}^{th}$ inches, $1^{1}/_{16}{}^{th}$ inches to $1^{7}/_{8}{}^{th}$ inches, $1^{1}/_{16}{}^{th}$ inches to $1^{13}/_{16}{}^{th}$ inches, $1^{1}/_{16}{}^{th}$ inches to $1^{3}/_{4}{}^{th}$ inches, $1^{1}/_{16}{}^{th}$ inches to $1^{11}/_{16}{}^{th}$ inches, $1^{1}/_{16}{}^{th}$ inches to $1^{5}/_{8}{}^{th}$ inches, $1^{1}/_{16}{}^{th}$ inches to $1^{9}/_{16}{}^{th}$ inches, $1^{1}/_{16}{}^{th}$ inches to $1^{1}/_{2}$ inches, $1^{1}/_{16}{}^{th}$ inches to $1^{7}/_{16}{}^{th}$ inches, $1^{1}/_{16}{}^{th}$ inches to $1^{3}/_{8}{}^{th}$ inches, $1^{1}/_{16}{}^{th}$ inches to $1^{5}/_{16}{}^{th}$ inches, $1^{1}/_{16}{}^{th}$ inches to $1^{1}/_{4}{}^{th}$ inches, $1^{1}/_{4}{}^{th}$ inches to 3 inches, $1^{1}/_{4}{}^{th}$ inches to $2^{15}/_{16}{}^{th}$ inches, $1^{1}/_{4}{}^{th}$ inches to $2^{7}/_{8}{}^{th}$ inches, $1^{1}/_{4}{}^{th}$ inches to $2^{13}/_{16}{}^{th}$ inches, $1^{1}/_{4}{}^{th}$ inches to $2^{3}/_{4}{}^{th}$ inches, $1^{1}/_{4}{}^{th}$ inches to $2^{11}/_{16}{}^{th}$ inches, $1^{1}/_{4}{}^{th}$ inches to $2^{5}/_{8}{}^{th}$ inches, $1^{1}/_{4}{}^{th}$ inches to $2^{9}/_{16}{}^{th}$ inches, $1^{1}/_{4}{}^{th}$ inches to $2^{1}/_{2}$ inches, $1^{1}/_{4}{}^{th}$ inches to $2^{7}/_{16}{}^{th}$ inches, $1^{1}/_{4}{}^{th}$ inches to $2^{3}/_{8}{}^{th}$ inches, $1^{1}/_{4}{}^{th}$ inches to $2^{5}/_{16}{}^{th}$ inches, $1^{1}/_{4}{}^{th}$ inches to $2^{1}/_{4}{}^{th}$ inches, $1^{1}/_{4}{}^{th}$ inches to $2^{1}/_{8}{}^{th}$ inches, $1^{1}/_{4}{}^{th}$ inches to $2^{1}/_{16}{}^{th}$ inches, $1^{1}/_{4}{}^{th}$ inches to 2 inches, $1^{1}/_{4}{}^{th}$ inches to $1^{15}/_{16}{}^{th}$ inches, $1^{1}/_{4}{}^{th}$ inches to $1^{7}/_{8}{}^{th}$ inches, $1^{1}/_{4}{}^{th}$ inches to $1^{13}/_{16}{}^{th}$ inches, $1^{1}/_{4}{}^{th}$ inches to $1^{3}/_{4}{}^{th}$ inches, $1^{1}/_{4}{}^{th}$ inches to $1^{11}/_{16}{}^{th}$ inches, $1^{1}/_{4}{}^{th}$ inches to $1^{5}/_{8}{}^{th}$ inches, $1^{1}/_{4}{}^{th}$ inches to $1^{9}/_{16}{}^{th}$ inches, $1^{1}/_{4}{}^{th}$ inches to $1^{1}/_{2}$ inches, $1^{1}/_{4}{}^{th}$ inches to $1^{7}/_{16}{}^{th}$ inches, $1^{1}/_{4}{}^{th}$ inches to $1^{3}/_{8}{}^{th}$ inches, $1^{5}/_{16}{}^{th}$ inches to 3 inches, $1^{5}/_{16}{}^{th}$ inches to $2^{15}/_{16}{}^{th}$ inches, $1^{5}/_{16}{}^{th}$ inches to $2^{7}/_{8}{}^{th}$ inches, $1^{5}/_{16}{}^{th}$ inches to $2^{13}/_{16}{}^{th}$ inches, $1^{5}/_{16}{}^{th}$ inches to $2^{3}/_{4}{}^{th}$ inches, $1^{5}/_{16}{}^{th}$ inches to $2^{11}/_{16}{}^{th}$ inches, $1^{5}/_{16}{}^{th}$ inches to $2^{5}/_{8}{}^{th}$ inches, $1^{5}/_{16}{}^{th}$ inches to $2^{9}/_{16}{}^{th}$ inches, $1^{5}/_{16}{}^{th}$ inches to $2^{1}/_{2}$ inches, $1^{5}/_{16}{}^{th}$ inches to $2^{7}/_{16}{}^{th}$ inches, $1^{5}/_{16}{}^{th}$ inches to $2^{3}/_{8}{}^{th}$ inches, $1^{5}/_{16}{}^{th}$ inches to $2^{5}/_{16}{}^{th}$ inches, $1^{5}/_{16}{}^{th}$ inches to $2^{1}/_{4}{}^{th}$ inches, $1^{5}/_{16}{}^{th}$ inches to $2^{1}/_{8}{}^{th}$ inches, $1^{5}/_{16}{}^{th}$ inches to $2^{1}/_{16}{}^{th}$ inches, $1^{5}/_{16}{}^{th}$ inches to 2 inches, $1^{5}/_{16}{}^{th}$ inches to $1^{15}/_{16}{}^{th}$ inches, $1^{5}/_{16}{}^{th}$ inches to $1^{7}/_{8}{}^{th}$ inches, $1^{5}/_{16}{}^{th}$ inches to $1^{13}/_{16}{}^{th}$ inches, $1^{5}/_{16}{}^{th}$ inches to $1^{3}/_{4}{}^{th}$ inches, $1^{5}/_{16}{}^{th}$ inches to $1^{11}/_{16}{}^{th}$ inches, $1^{5}/_{16}{}^{th}$ inches to $1^{5}/_{8}{}^{th}$ inches, $1^{5}/_{16}{}^{th}$ inches to $1^{9}/_{16}{}^{th}$ inches, $1^{5}/_{16}{}^{th}$ inches to $1^{1}/_{2}$ inches, $1^{5}/_{16}{}^{th}$ inches to $1^{7}/_{16}{}^{th}$ inches, $1^{5}/_{16}{}^{th}$ inches to $1^{3}/_{8}{}^{th}$ inches, $1^{3}/_{8}{}^{th}$ inches to 3 inches, $1^{3}/_{8}{}^{th}$ inches to $2^{15}/_{16}{}^{th}$ inches, $1^{3}/_{8}{}^{th}$ inches to $2^{7}/_{8}{}^{th}$ inches, $1^{3}/_{8}{}^{th}$ inches to $2^{13}/_{16}{}^{th}$ inches, $1^{3}/_{8}{}^{th}$ inches to $2^{3}/_{4}{}^{th}$ inches, $1^{3}/_{8}{}^{th}$ inches to $2^{11}/_{16}{}^{th}$ inches, $1^{3}/_{8}{}^{th}$ inches to $2^{5}/_{8}{}^{th}$ inches, $1^{3}/_{8}{}^{th}$ inches to $2^{9}/_{16}{}^{th}$ inches, $1^{3}/_{8}{}^{th}$ inches to $2^{1}/_{2}$ inches, $1^{3}/_{8}{}^{th}$ inches to $2^{7}/_{16}{}^{th}$ inches, $1^{3}/_{8}{}^{th}$ inches to $2^{3}/_{8}{}^{th}$ inches, $1^{3}/_{8}{}^{th}$ inches to $2^{5}/_{16}{}^{th}$ inches, $1^{3}/_{8}{}^{th}$ inches to $2^{1}/_{4}{}^{th}$ inches, $1^{3}/_{8}{}^{th}$ inches to $2^{1}/_{8}{}^{th}$ inches, $1^{3}/_{8}{}^{th}$ inches to $2^{1}/_{16}{}^{th}$ inches, $1^{3}/_{8}{}^{th}$ inches to 2 inches, $1^{3}/_{8}{}^{th}$ inches to $1^{15}/_{16}{}^{th}$ inches, $1^{3}/_{8}{}^{th}$ inches to $1^{7}/_{8}{}^{th}$ inches, $1^{3}/_{8}{}^{th}$ inches to $1^{13}/_{16}{}^{th}$ inches, $1^{3}/_{8}{}^{th}$ inches to $1^{3}/_{4}{}^{th}$ inches, $1^{3}/_{8}{}^{th}$ inches to $1^{11}/_{16}{}^{th}$ inches, $1^{3}/_{8}{}^{th}$ inches to $1^{5}/_{8}{}^{th}$ inches, $1^{3}/_{8}{}^{th}$ inches to $1^{9}/_{16}{}^{th}$ inches, $1^{3}/_{8}{}^{th}$ inches to $1^{1}/_{2}$ inches, $1^{3}/_{8}{}^{th}$ inches to $1^{7}/_{16}{}^{th}$ inches, $1^{7}/_{16}{}^{th}$ inches to 3 inches, $1^{7}/_{16}{}^{th}$ inches to $2^{15}/_{16}{}^{th}$ inches, $1^{7}/_{16}{}^{th}$ inches to $2^{7}/_{8}{}^{th}$ inches, $1^{7}/_{16}{}^{th}$ inches to $2^{13}/_{16}{}^{th}$ inches, $1^{7}/_{16}{}^{th}$ inches to $2^{3}/_{4}{}^{th}$ inches, $1^{7}/_{16}{}^{th}$ inches to $2^{11}/_{16}{}^{th}$ inches, $1^{7}/_{16}{}^{th}$ inches to $2^{5}/_{8}{}^{th}$ inches, $1^{7}/_{16}{}^{th}$ inches to $2^{9}/_{16}{}^{th}$ inches, $1^{7}/_{16}{}^{th}$ inches to $2^{1}/_{2}$ inches, $1^{7}/_{16}{}^{th}$ inches to $2^{7}/_{16}{}^{th}$ inches, $1^{7}/_{16}{}^{th}$ inches to $2^{3}/_{8}{}^{th}$ inches, $1^{7}/_{16}{}^{th}$ inches to $2^{5}/_{16}{}^{th}$ inches, $1^{7}/_{16}{}^{th}$ inches to $2^{1}/_{4}{}^{th}$ inches, $1^{7}/_{16}{}^{th}$ inches to $2^{1}/_{8}{}^{th}$ inches, $1^{7}/_{16}{}^{th}$ inches to $2^{1}/_{16}{}^{th}$ inches, $1^{7}/_{16}{}^{th}$ inches to 2 inches, $1^{7}/_{16}{}^{th}$ inches to $1^{15}/_{16}{}^{th}$ inches, $1^{7}/_{16}{}^{th}$ inches to $1^{7}/_{8}{}^{th}$ inches, $1^{7}/_{16}{}^{th}$ inches to $1^{13}/_{16}{}^{th}$ inches, $1^{7}/_{16}{}^{th}$ inches to $1^{3}/_{4}{}^{th}$ inches, $1^{7}/_{16}{}^{th}$ inches to $1^{11}/_{16}{}^{th}$ inches, $1^{7}/_{16}{}^{th}$ inches to $1^{5}/_{8}{}^{th}$ inches, $1^{7}/_{16}{}^{th}$ inches to $1^{9}/_{16}{}^{th}$ inches, $1^{7}/_{16}{}^{th}$ inches to $1^{1}/_{2}$ inches, $1^{1}/_{2}$ inches to 3 inches, $1^{1}/_{2}$ inches to $2^{15}/_{16}{}^{th}$ inches, $1^{1}/_{2}$ inches to $2^{7}/_{8}{}^{th}$ inches, $1^{1}/_{2}$ inches to $2^{13}/_{16}{}^{th}$ inches, $1^{1}/_{2}$ inches to $2^{3}/_{4}{}^{th}$ inches, $1^{1}/_{2}$ inches to $2^{11}/_{16}{}^{th}$ inches, $1^{1}/_{2}$ inches to $2^{5}/_{8}{}^{th}$ inches, $1^{1}/_{2}$ inches to $2^{9}/_{16}{}^{th}$ inches, $1^{1}/_{2}$ inches to $2^{1}/_{2}$ inches, $1^{1}/_{2}$ inches to $2^{7}/_{16}{}^{th}$ inches, $1^{1}/_{2}$ inches to $2^{3}/_{8}{}^{th}$ inches, $1^{1}/_{2}$ inches to $2^{5}/_{16}{}^{th}$ inches, $1^{1}/_{2}$ inches to $2^{1}/_{4}{}^{th}$ inches, $1^{1}/_{2}$ inches to $2^{1}/_{8}{}^{th}$ inches, $1^{1}/_{2}$ inches to $2^{1}/_{16}{}^{th}$ inches, $1^{1}/_{2}$ inches to 2 inches, $1^{1}/_{2}$ inches to $1^{15}/_{16}{}^{th}$ inches, $1^{1}/_{2}$ inches to $1^{7}/_{8}{}^{th}$ inches, $1^{1}/_{2}$ inches to $1^{13}/_{16}{}^{th}$ inches, $1^{1}/_{2}$ inches to $1^{3}/_{4}{}^{th}$ inches, $1^{1}/_{2}$ inches to $1^{11}/_{16}{}^{th}$ inches, $1^{1}/_{2}$ inches to $1^{5}/_{8}{}^{th}$ inches, $1^{1}/_{2}$ inches to $1^{9}/_{16}{}^{th}$ inches, $1^{9}/_{16}{}^{th}$ inches to 3 inches, $1^{9}/_{16}{}^{th}$ inches to $2^{15}/_{16}{}^{th}$ inches, $1^{9}/_{16}{}^{th}$ inches to $2^{7}/_{8}{}^{th}$ inches, $1^{9}/_{16}{}^{th}$ inches to $2^{13}/_{16}{}^{th}$ inches, $1^{9}/_{16}{}^{th}$ inches to $2^{3}/_{4}{}^{th}$ inches, $1^{9}/_{16}{}^{th}$ inches to $2^{11}/_{16}{}^{th}$ inches, $1^{9}/_{16}{}^{th}$ inches to $2^{5}/_{8}{}^{th}$ inches, $1^{9}/_{16}{}^{th}$ inches to $2^{9}/_{16}{}^{th}$ inches, $1^{9}/_{16}{}^{th}$ inches to $2^{1}/_{2}$ inches, $1^{9}/_{16}{}^{th}$ inches to $2^{7}/_{16}{}^{th}$ inches, $1^{9}/_{16}{}^{th}$ inches to $2^{3}/_{8}{}^{th}$ inches, $1^{9}/_{16}{}^{th}$ inches to $2^{5}/_{16}{}^{th}$ inches, $1^{9}/_{16}{}^{th}$ inches to $2^{1}/_{4}{}^{th}$ inches, $1^{9}/_{16}{}^{th}$ inches to $2^{1}/_{8}{}^{th}$ inches, $1^{9}/_{16}{}^{th}$ inches to $2^{1}/_{16}{}^{th}$ inches, $1^{9}/_{16}{}^{th}$ inches to 2 inches, $1^{9}/_{16}{}^{th}$ inches to $1^{15}/_{16}{}^{th}$ inches, $1^{9}/_{16}{}^{th}$ inches to $1^{7}/_{8}{}^{th}$ inches, $1^{9}/_{16}{}^{th}$ inches to $1^{13}/_{16}{}^{th}$ inches, $1^{9}/_{16}{}^{th}$ inches to $1^{3}/_{4}{}^{th}$ inches, $1^{9}/_{16}{}^{th}$ inches to $1^{11}/_{16}{}^{th}$ inches, $1^{5}/_{8}{}^{th}$ inches to 3 inches, $1^{5}/_{8}{}^{th}$ inches to $2^{15}/_{16}{}^{th}$ inches, $1^{5}/_{8}{}^{th}$ inches to $2^{7}/_{8}{}^{th}$ inches, $1^{5}/_{8}{}^{th}$ inches to $2^{13}/_{16}{}^{th}$ inches, $1^{5}/_{8}{}^{th}$ inches to $2^{3}/_{4}{}^{th}$ inches, $1^{5}/_{8}{}^{th}$ inches to $2^{11}/_{16}{}^{th}$ inches, $1^{5}/_{8}{}^{th}$ inches to $2^{5}/_{8}{}^{th}$ inches, $1^{5}/_{8}{}^{th}$ inches to $2^{9}/_{16}{}^{th}$ inches, $1^{5}/_{8}{}^{th}$ inches to $2^{1}/_{2}$ inches, $1^{5}/_{8}{}^{th}$ inches to $2^{7}/_{16}{}^{th}$ inches, $1^{5}/_{8}{}^{th}$ inches to $2^{3}/_{8}{}^{th}$ inches, $1^{5}/_{8}{}^{th}$ inches to $2^{5}/_{16}{}^{th}$ inches, $1^{5}/_{8}{}^{th}$ inches to $2^{1}/_{4}{}^{th}$ inches, $1^{5}/_{8}{}^{th}$ inches to $2^{1}/_{8}{}^{th}$ inches, $1^{5}/_{8}{}^{th}$ inches to 2 inches, $1^{5}/_{8}{}^{th}$ inches to $1^{15}/_{16}{}^{th}$ inches, $1^{5}/_{8}{}^{th}$ inches to $1^{7}/_{8}{}^{th}$ inches, $1^{5}/_{8}{}^{th}$ inches to $1^{13}/_{16}{}^{th}$ inches, $1^{5}/_{8}{}^{th}$ inches to $1^{3}/_{4}{}^{th}$ inches, $1^{5}/_{8}{}^{th}$ inches to $1^{11}/_{16}{}^{th}$ inches, $1^{11}/_{16}{}^{th}$ inches to 3 inches, $1^{11}/_{16}{}^{th}$ inches to $2^{15}/_{16}{}^{th}$ inches, $1^{11}/_{16}{}^{th}$ inches to $2^{7}/_{8}{}^{th}$ inches, $1^{11}/_{16}{}^{th}$ inches to $2^{13}/_{16}{}^{th}$ inches, $1^{11}/_{16}{}^{th}$ inches to $2^{3}/_{4}{}^{th}$ inches, $1^{11}/_{16}{}^{th}$ inches to $2^{11}/_{16}{}^{th}$ inches, $1^{11}/_{16}{}^{th}$ inches to $2^{5}/_{8}{}^{th}$ inches, $1^{11}/_{16}{}^{th}$ inches to $2^{9}/_{16}{}^{th}$ inches, $1^{11}/_{16}{}^{th}$ inches to $2^{1}/_{2}$ inches, $1^{11}/_{16}{}^{th}$ inches to $2^{7}/_{16}{}^{th}$ inches, $1^{11}/_{16}{}^{th}$ inches to $2^{3}/_{8}{}^{th}$ inches, $1^{11}/_{16}{}^{th}$ inches to $2^{5}/_{16}{}^{th}$ inches, $1^{11}/_{16}{}^{th}$ inches to $2^{1}/_{4}{}^{th}$ inches, $1^{11}/_{16}{}^{th}$ inches to $2^{1}/_{8}{}^{th}$ inches, $1^{11}/_{16}{}^{th}$ inches to $2^{1}/_{16}{}^{th}$ inches, $1^{11}/_{16}{}^{th}$ inches to 2 inches, $1^{11}/_{16}{}^{th}$ inches to $1^{15}/_{16}{}^{th}$ inches, $1^{11}/_{16}{}^{th}$ inches to $1^{7}/_{8}{}^{th}$ inches, $1^{11}/_{16}{}^{th}$ inches to $1^{13}/_{16}{}^{th}$ inches, $1^{11}/_{16}{}^{th}$ inches to $1^{3}/_{4}{}^{th}$ inches, $1^{3}/_{4}{}^{th}$ inches to 3 inches, $1^{3}/_{4}{}^{th}$ inches to $2^{15}/_{16}{}^{th}$ inches, $1^{3}/_{4}{}^{th}$ inches to $2^{7}/_{8}{}^{th}$ inches, $1^{3}/_{4}{}^{th}$ inches to $2^{13}/_{16}{}^{th}$ inches, $1^{3}/_{4}{}^{th}$ inches to $2^{3}/_{4}{}^{th}$ inches, $1^{3}/_{4}{}^{th}$ inches to $2^{11}/_{16}{}^{th}$ inches, $1^{3}/_{4}{}^{th}$ inches to $2^{5}/_{8}{}^{th}$ inches, $1^{3}/_{4}{}^{th}$ inches to $2^{9}/_{16}{}^{th}$ inches, $1^{3}/_{4}{}^{th}$ inches to $2^{1}/_{2}$ inches, $1^{3}/_{4}{}^{th}$ inches to $2^{7}/_{16}{}^{th}$ inches, $1^{3}/_{4}{}^{th}$ inches to $2^{3}/_{8}{}^{th}$ inches, $1^{3}/_{4}{}^{th}$ inches to $2^{5}/_{16}{}^{th}$ inches, $1^{3}/_{4}{}^{th}$ inches to $2^{1}/_{4}{}^{th}$ inches, $1^{3}/_{4}{}^{th}$ inches to $2^{1}/_{8}{}^{th}$ inches, $1^{3}/_{4}{}^{th}$ inches to $2^{1}/_{16}{}^{th}$ inches, $1^{3}/_{4}{}^{th}$ inches to 2 inches, $1^{3}/_{4}{}^{th}$ inches to $1^{15}/_{16}{}^{th}$ inches, $1^{3}/_{4}{}^{th}$ inches to $1^{7}/_{8}{}^{th}$ inches, $1^{3}/_{4}{}^{th}$ inches to $1^{13}/_{16}{}^{th}$ inches, $1^{13}/_{16}{}^{th}$ inches to 3 inches, $1^{13}/_{16}{}^{th}$ inches to $2^{15}/_{16}{}^{th}$ inches, $1^{13}/_{16}{}^{th}$ inches to $2^{7}/_{8}{}^{th}$ inches, $1^{13}/_{16}{}^{th}$ inches to $2^{13}/_{16}{}^{th}$ inches, $1^{13}/_{16}{}^{th}$ inches to $2^{3}/_{4}{}^{th}$ inches, $1^{13}/_{16}{}^{th}$ inches to $2^{11}/_{16}{}^{th}$ inches, $1^{13}/_{16}{}^{th}$ inches to $2^{5}/_{8}{}^{th}$ inches, $1^{13}/_{16}{}^{th}$ inches to $2^{9}/_{16}{}^{th}$ inches, $1^{13}/_{16}{}^{th}$ inches to $2^{1}/_{2}$ inches, $1^{13}/_{16}{}^{th}$ inches to $2^{7}/_{16}{}^{th}$ inches, $1^{13}/_{16}{}^{th}$ inches to $2^{3}/_{8}{}^{th}$ inches, $1^{13}/_{16}{}^{th}$ inches to $2^{5}/_{16}{}^{th}$ inches, $1^{13}/_{16}{}^{th}$ inches to $2^{1}/_{4}{}^{th}$ inches, $1^{13}/_{16}{}^{th}$ inches to $2^{1}/_{8}{}^{th}$ inches, $1^{13}/_{16}{}^{th}$ inches to $2^{1}/_{16}{}^{th}$ inches, $1^{13}/_{16}{}^{th}$ inches to 2 inches, $1^{13}/_{16}{}^{th}$ inches to $1^{15}/_{16}{}^{th}$ inches, $1^{13}/_{16}{}^{th}$ inches to $1^{7}/_{8}{}^{th}$ inches, $1^{7}/_{8}{}^{th}$ inches to 3 inches, $1^{7}/_{8}{}^{th}$ inches to $2^{15}/_{16}{}^{th}$ inches, $1^{7}/_{8}{}^{th}$ inches to $2^{7}/_{8}{}^{th}$ inches, $1^{7}/_{8}{}^{th}$ inches to $2^{13}/_{16}{}^{th}$ inches, $1^{7}/_{8}{}^{th}$ inches to $2^{3}/_{4}{}^{th}$ inches, $1^{7}/_{8}{}^{th}$ inches to $2^{11}/_{16}{}^{th}$ inches, $1^{7}/_{8}{}^{th}$ inches to $2^{5}/_{8}{}^{th}$ inches, $1^{7}/_{8}{}^{th}$ inches to $2^{9}/_{16}{}^{th}$ inches, $1^{7}/_{8}{}^{th}$ inches to $2^{1}/_{2}$ inches, $1^{7}/_{8}{}^{th}$ inches to $2^{7}/_{16}{}^{th}$ inches, $1^{7}/_{8}{}^{th}$ inches to $2^{3}/_{8}{}^{th}$ inches, $1^{7}/_{8}{}^{th}$ inches to $2^{5}/_{16}{}^{th}$ inches, $1^{7}/_{8}{}^{th}$ inches to $2^{1}/_{4}{}^{th}$ inches, $1^{7}/_{8}{}^{th}$ inches to $2^{1}/_{8}{}^{th}$ inches, $1^{7}/_{8}{}^{th}$ inches to $2^{1}/_{16}{}^{th}$ inches, $1^{7}/_{8}{}^{th}$ inches to 2 inches, $1^{7}/_{8}{}^{th}$ inches to $1^{15}/_{16}{}^{th}$ inches, $1^{15}/_{16}{}^{th}$ inches to 3 inches, $1^{15}/_{16}{}^{th}$ inches to $2^{15}/_{16}{}^{th}$ inches, $1^{15}/_{16}{}^{th}$ inches to $2^{7}/_{8}{}^{th}$ inches, $1^{15}/_{16}{}^{th}$ inches to $2^{13}/_{16}{}^{th}$ inches, $1^{15}/_{16}{}^{th}$ inches to $2^{3}/_{4}{}^{th}$ inches, $1^{15}/_{16}{}^{th}$ inches to $2^{11}/_{16}{}^{th}$ inches, $1^{15}/_{16}{}^{th}$ inches to $2^{5}/_{8}{}^{th}$ inches, 1$^{15}$/$_{16}$$^{th}$ inches to 2$^{9}$/$_{16}$$^{th}$ inches, 1$^{15}$/$_{16}$$^{th}$ inches to 2½ inches, 1$^{15}$/$_{16}$$^{th}$ inches to 2$^{7}$/$_{16}$$^{th}$ inches, 1$^{15}$/$_{16}$$^{th}$ inches to 2⅜$^{th}$ inches, 1$^{15}$/$_{16}$$^{th}$ inches to 2$^{5}$/$_{16}$$^{th}$ inches, 1$^{15}$/$_{16}$$^{th}$ inches to 2¼$^{th}$ inches, 1$^{15}$/$_{16}$$^{th}$ inches to 2⅛$^{th}$ inches, 1$^{15}$/$_{16}$$^{th}$ inches to 2$^{1}$/$_{16}$$^{th}$ inches, 1$^{15}$/$_{16}$$^{th}$ inches to 2 inches, 2 inches to 3 inches, 2 inches to 2$^{15}$/$_{16}$$^{th}$ inches, 2 inches to 2$^{13}$/$_{16}$$^{th}$ inches, 2 inches to 2¾$^{th}$ inches, 2 inches to 2$^{11}$/$_{16}$$^{th}$ inches, 2 inches to 2⅝$^{th}$ inches, 2 inches to 2$^{9}$/$_{16}$$^{th}$ inches, 2 inches to 2½ inches, 2 inches to 2$^{7}$/$_{16}$$^{th}$ inches, 2 inches to 2⅜$^{th}$ inches, 2 inches to 2$^{5}$/$_{16}$$^{th}$ inches, 2 inches to 2¼$^{th}$ inches, 2 inches to 2⅛$^{th}$ inches, 2 inches to 2$^{1}$/$_{16}$$^{th}$ inches, 2$^{1}$/$_{16}$$^{th}$ inches to 3 inches, 2$^{1}$/$_{16}$$^{th}$ inches to 2$^{15}$/$_{16}$$^{th}$ inches, 2$^{1}$/$_{16}$$^{th}$ inches to 2⅞$^{th}$ inches, 2$^{1}$/$_{16}$$^{th}$ inches to 2$^{13}$/$_{16}$$^{th}$ inches, 2$^{1}$/$_{16}$$^{th}$ inches to 2¾$^{th}$ inches, 2$^{1}$/$_{16}$$^{th}$ inches to 2$^{11}$/$_{16}$$^{th}$ inches, 2$^{1}$/$_{16}$$^{th}$ inches to 2⅝$^{th}$ inches, 2$^{1}$/$_{16}$$^{th}$ inches to 2$^{9}$/$_{16}$$^{th}$ inches, 2$^{1}$/$_{16}$$^{th}$ to 2½ inches, 2$^{1}$/$_{16}$$^{th}$ inches to 2$^{7}$/$_{16}$$^{th}$ inches, 2$^{1}$/$_{16}$$^{th}$ inches to 2⅜$^{th}$ inches, 2$^{1}$/$_{16}$$^{th}$ inches to 2$^{5}$/$_{16}$$^{th}$ inches, 2$^{1}$/$_{16}$$^{th}$ inches to 2¼$^{th}$ inches, 2$^{1}$/$_{16}$$^{th}$ inches to 2⅛$^{th}$ inches, 2⅛$^{th}$ inches to 3 inches, 2⅛$^{th}$ inches to 2$^{15}$/$_{16}$$^{th}$ inches, 2⅛$^{th}$ inches to 2⅞$^{th}$ inches, 2⅛$^{th}$ inches to 2$^{13}$/$_{16}$$^{th}$ inches, 2⅛$^{th}$ inches to 2¾$^{th}$ inches, 2⅛$^{th}$ inches to 2$^{11}$/$_{16}$$^{th}$ inches, 2⅛$^{th}$ inches to 2⅝$^{th}$ inches, 2⅛$^{th}$ inches to 2$^{9}$/$_{16}$$^{th}$ inches, 2⅛$^{th}$ to 2½ inches, 2⅛$^{th}$ inches to 2$^{7}$/$_{16}$$^{th}$ inches, 2⅛$^{th}$ inches to 2⅜$^{th}$ inches, 2⅛$^{th}$ inches to 2$^{5}$/$_{16}$$^{th}$ inches, 2⅛$^{th}$ inches to 2¼$^{th}$ inches, 2⅛$^{th}$ inches to 2$^{3}$/$_{16}$$^{th}$ inches, 2$^{3}$/$_{16}$$^{th}$ inches to 3 inches, 2$^{3}$/$_{16}$$^{th}$ inches to 2$^{15}$/$_{16}$$^{th}$ inches, 2$^{3}$/$_{16}$$^{th}$ inches to 2⅞$^{th}$ inches, 2$^{3}$/$_{16}$$^{th}$ inches to 2$^{13}$/$_{16}$$^{th}$ inches, 2$^{3}$/$_{16}$$^{th}$ inches to 2¾$^{th}$ inches, 2$^{3}$/$_{16}$$^{th}$ inches to 2$^{11}$/$_{16}$$^{th}$ inches, 2$^{3}$/$_{16}$$^{th}$ inches to 2⅝$^{th}$ inches, 2$^{3}$/$_{16}$$^{th}$ inches to 2$^{9}$/$_{16}$$^{th}$ inches, 2$^{3}$/$_{16}$$^{th}$ to 2½ inches, 2$^{3}$/$_{16}$$^{th}$ inches to 2$^{7}$/$_{16}$$^{th}$ inches, 2$^{3}$/$_{16}$$^{th}$ inches to 2⅜$^{th}$ inches, 2$^{3}$/$_{16}$$^{th}$ inches to 2$^{5}$/$_{16}$$^{th}$ inches, 2$^{3}$/$_{16}$$^{th}$ inches to 2¼$^{th}$ inches, 2¼$^{th}$ inches to 3 inches, 2¼$^{th}$ inches to 2$^{15}$/$_{16}$$^{th}$ inches, 2¼$^{th}$ inches to 2⅞$^{th}$ inches, 2¼$^{th}$ inches to 2$^{13}$/$_{16}$$^{th}$ inches, 2¼$^{th}$ inches to 2¾$^{th}$ inches, 2¼$^{th}$ inches to 2$^{11}$/$_{16}$$^{th}$ inches, 2¼$^{th}$ inches to 2⅝$^{th}$ inches, 2¼$^{th}$ inches to 2$^{9}$/$_{16}$$^{th}$ inches, 2¼$^{th}$ to 2½ inches, 2¼$^{th}$ inches to 2$^{7}$/$_{16}$$^{th}$ inches, 2¼$^{th}$ inches to 2⅜$^{th}$ inches, 2¼$^{th}$ inches to 2$^{5}$/$_{16}$$^{th}$ inches, 2$^{5}$/$_{16}$$^{th}$ inches to 3 inches, 2$^{5}$/$_{16}$$^{th}$ inches to 2$^{15}$/$_{16}$$^{th}$ inches, 2$^{5}$/$_{16}$$^{th}$ inches to 2⅞$^{th}$ inches, 2$^{5}$/$_{16}$$^{th}$ inches to 2$^{13}$/$_{16}$$^{th}$ inches, 2$^{5}$/$_{16}$$^{th}$ inches to 2¾$^{th}$ inches, 2$^{5}$/$_{16}$$^{th}$ inches to 2$^{11}$/$_{16}$$^{th}$ inches, 2$^{5}$/$_{16}$$^{th}$ inches to 2⅝$^{th}$ inches, 2$^{5}$/$_{16}$$^{th}$ inches to 2$^{9}$/$_{16}$$^{th}$ inches, 2$^{5}$/$_{16}$$^{th}$ inches to 2½ inches, 2$^{5}$/$_{16}$$^{th}$ inches to 2$^{7}$/$_{16}$$^{th}$ inches, 2$^{5}$/$_{16}$$^{th}$ inches to ⅜$^{th}$ inches, 2⅜$^{th}$ inches to 3 inches, 2⅜$^{th}$ inches to 2$^{15}$/$_{16}$$^{th}$ inches, 2⅜$^{th}$ inches to 2⅞$^{th}$ inches, 2⅜$^{th}$ inches to 2$^{13}$/$_{16}$$^{th}$ inches, 2⅜$^{th}$ inches to 2¾$^{th}$ inches, 2⅜$^{th}$ inches to 2$^{11}$/$_{16}$$^{th}$ inches, 2⅜$^{th}$ inches to 2⅝$^{th}$ inches, 2⅜$^{th}$ inches to 2$^{9}$/$_{16}$$^{th}$ inches, 2⅜$^{th}$ inches to 2½ inches, 2⅜$^{th}$ inches to 2$^{7}$/$_{16}$$^{th}$ inches, 2$^{7}$/$_{16}$$^{th}$ inches to 3 inches, 2$^{7}$/$_{16}$$^{th}$ inches to 2$^{15}$/$_{16}$$^{th}$ inches, 2$^{7}$/$_{16}$$^{th}$ inches to 2⅞$^{th}$ inches, 2$^{7}$/$_{16}$$^{th}$ inches to 2$^{13}$/$_{16}$$^{th}$ inches, 2$^{7}$/$_{16}$$^{th}$ inches to 2¾$^{th}$ inches, 2$^{7}$/$_{16}$$^{th}$ inches to 2$^{11}$/$_{16}$$^{th}$ inches, 2$^{7}$/$_{16}$$^{th}$ inches to 2⅝$^{th}$ inches, 2$^{7}$/$_{16}$$^{th}$ inches to 2$^{9}$/$_{16}$$^{th}$ inches, 2$^{7}$/$_{16}$$^{th}$ inches to 2½ inches, 2½ inches to 3 inches, 2½ inches to 2$^{15}$/$_{16}$$^{th}$ inches, 2½ inches to 2⅞$^{th}$ inches, 2½ inches to 2$^{13}$/$_{16}$$^{th}$ inches, 2½ inches to 2¾ inches, 2½ inches to 2$^{11}$/$_{16}$$^{th}$ inches, 2½ inches to 2⅝$^{th}$ inches, 2½ inches to 2$^{9}$/$_{16}$$^{th}$ inches, 2$^{9}$/$_{16}$$^{th}$ inches to 3 inches, 2$^{9}$/$_{16}$$^{th}$ inches to 2$^{15}$/$_{16}$$^{th}$ inches, 2$^{9}$/$_{16}$$^{th}$ inches to 2⅞$^{th}$ inches, 2$^{9}$/$_{16}$$^{th}$ inches to 2$^{13}$/$_{16}$$^{th}$ inches, 2$^{9}$/$_{16}$$^{th}$ inches to 2¾ inches, 2$^{9}$/$_{16}$$^{th}$ inches to 2$^{11}$/$_{16}$$^{th}$ inches, 2$^{9}$/$_{16}$$^{th}$ inches to 2⅝$^{th}$ inches, 2⅝$^{th}$ inches to 3 inches, 2⅝$^{th}$ inches to 2$^{15}$/$_{16}$$^{th}$ inches, 2⅝$^{th}$ inches to 2⅞$^{th}$ inches, 2⅝$^{th}$ inches to 2$^{13}$/$_{16}$$^{th}$ inches, 2⅝$^{th}$ inches to 2¾ inches, 2⅝$^{th}$ inches to 2$^{11}$/$_{16}$$^{th}$ inches, 2$^{11}$/$_{16}$$^{th}$ inches to 3 inches, 2$^{11}$/$_{16}$$^{th}$ inches to 2$^{15}$/$_{16}$$^{th}$ inches, 2$^{11}$/$_{16}$$^{th}$ inches to 2⅞$^{th}$ inches, 2$^{11}$/$_{16}$$^{th}$ inches to 2$^{13}$/$_{16}$$^{th}$ inches, 2$^{11}$/$_{16}$$^{th}$ inches to 2¾ inches, 2¾$^{th}$ inches to 3 inches, 2¾$^{th}$ inches to 2$^{15}$/$_{16}$$^{th}$ inches, 2¾$^{th}$ inches to 2⅞$^{th}$ inches, 2¾$^{th}$ inches to 2$^{13}$/$_{16}$$^{th}$ inches, 2$^{13}$/$_{16}$$^{th}$ inches to 3 inches, 2$^{13}$/$_{16}$$^{th}$ inches to 2$^{15}$/$_{16}$$^{th}$ inches, 2$^{13}$/$_{16}$$^{th}$ inches to 2⅞$^{th}$ inches, 2⅞$^{th}$ inches to 3 inches, 2⅞$^{th}$ inches to 2$^{15}$/$_{16}$$^{th}$ inches, and 2$^{15}$/$_{16}$$^{th}$ inches to 3 inches. Other lengths also can be provided.

In embodiments, the surfacing media 46 of the sealant attachment zone 41 can include various particulate materials. For example, in embodiments, sand, granule fines, talcs, stone dust, synthetic particles, polymer particles, composite particles, rubber particles, waxes, or any suitable particles or other suitable materials or combinations thereof. As shown in FIGS. 1 and 3B, in some embodiments, the sealant attachment zone 41 can include a surfacing media that comprises a different material than the headlap and butt granules, including different types of granules providing a different appearance from exposure and the headlap portions of the cap shingles (e.g., the color and/or the texture of the surfacing materials can be different).

In addition, in embodiments, the sealant attachment zone 41 can include materials that have an affinity for the sealant 30 adapted for enhancing the adhesion between the overlapping cap shingles. For example, the sealant attachment zone 41 material can include a surfacing media 46 comprising polar polymers having affinity to asphalt, scrim or tape materials with functionalized surfaces, adhesion promoters, surfaces with tackifiers' surfaces with surface treatments to enhance sealant bonds; polymer films or coatings or other suitable materials; or combinations thereof. In some embodiments, the surfacing materials can include fines and/or other particulate materials such as sand, limestone particles, fillers, varying size granules, which can include, in some embodiments headlap and/or butt granules, or combinations thereof.

In embodiments, the particulate materials can have various sizes; and in some embodiments can have a size of 4 US standard sieve size (4.75 mm) to 325 US standard sieve size (0.044 mm). For example, in embodiments where granules, such as headlap granules, butt granules, other types of granules, or combinations thereof, are used, such granules can have a size of 10 US standard sieve size (1.70 mm) to 50 US standard sieve size (0.30 mm), and in some embodiments, can have a size of 10 US standard sieve size (1.70 mm) to 40 US standard sieve size (0.42 mm); 10 US standard sieve size (1.70 mm) to 30 US standard sieve size (0.59 mm); 10 US standard sieve size (1.70 mm) to 20 US standard sieve size (0.84 mm); 20 US standard sieve size (0.84 mm) to 50 US standard sieve size (0.30 mm); 20 US standard sieve size (0.84 mm) to 40 US standard sieve size (0.42 mm); 20 US standard sieve size (0.84 mm) to 30 US standard sieve size (0.59 mm); 30 US standard sieve size (0.59 mm) to 50 US standard sieve size (0.30 mm); or 30 US standard sieve size (0.59 mm) to 40 US standard sieve size (0.42 mm). In other embodiments, other varying size and types of granules also can be used.

In embodiments, such as where the surfacing media comprises other particulates such as sand, such particulates of the surfacing media can have a size of 30 US standard sieve size (0.59 mm) to 100 US standard sieve size (0.149 mm); and in some embodiments, can have a size of 30 US standard sieve size (0.59 mm) to 80 US standard sieve size (0.177 mm); 30 US standard sieve size (0.59 mm) to 70 US standard sieve size (0.21 mm); 30 US standard sieve size (0.59 mm) to 60 US standard sieve size (0.25 mm); 30 US standard sieve size (0.59 mm) to 50 US standard sieve size (0.30 mm); 30 US standard sieve size (0.59 mm) to 40 US standard sieve size (0.42 mm); 40 US standard sieve size (0.42 mm) to 100 US standard sieve size (0.149 mm); 40 US standard sieve size (0.42 mm) to 80 US standard sieve size (0.177 mm); 40 US standard sieve size (0.42 mm) to 70 US standard sieve size (0.21 mm); 40 US standard sieve size (0.59 mm) to 60 US standard sieve size (0.25 mm); 40 US standard sieve size (0.59 mm) to 50 US standard sieve size (0.30 mm); 50 US standard sieve size (0.30 mm) to 100 US standard sieve size (0.149 mm); 50 US standard sieve size (0.30 mm) to 80 US standard sieve size (0.177 mm); 50 US standard sieve size (0.30 mm) to 70 US standard sieve size (0.21 mm); 50 US standard sieve size (0.30 mm) to 60 US standard sieve size (0.25 mm); 60 US standard sieve size (0.25 mm) to 100 US standard sieve size (0.149 mm); 60 US standard sieve size (0.25 mm) to 80 US standard sieve size (0.177 mm); 60 US standard sieve size (0.25 mm) to 70 US standard sieve size (0.21 mm); 70 US standard sieve size (0.21 mm) to 100 US standard sieve size (0.149 mm); 70 US standard sieve size (0.21 mm) to 80 US standard sieve size (0.177 mm); and 80 US standard sieve size (0.177 mm) to 100 US standard sieve size (0.149 mm). Other size sand particles also can be used.

In some embodiments, smaller particulate materials also can be used as the surfacing media or at least a portion thereof. For example, limestone particles or filler materials can be used, having a size of 100 US standard sieve size (0.149 mm) to 325 US standard sieve size (0.044 mm); and in some embodiments, such particulate materials can have a size of 100 US standard sieve size (0.149 mm) to 270 US standard sieve size (0.053 mm); 100 US standard sieve size (0.149 mm) to 230 US standard sieve size (0.062 mm); 100 US standard sieve size (0.149 mm) to 200 US standard sieve size (0.074 mm); 100 US standard sieve size (0.149 mm) to 170 US standard sieve size (0.088 mm); 100 US standard sieve size (0.149 mm) to 140 US standard sieve size (0.105 mm); 100 US standard sieve size (0.149 mm) to 120 US standard sieve size (0.125 mm); 120 US standard sieve size (0.125 mm) to 325 US standard sieve size (0.044 mm); 120 US standard sieve size (0.125 mm) to 270 US standard sieve size (0.053 mm); 120 US standard sieve size (0.125 mm) to 230 US standard sieve size (0.062 mm); 120 US standard sieve size (0.125 mm) to 200 US standard sieve size (0.074 mm); 120 US standard sieve size (0.125 mm) to 170 US standard sieve size (0.088 mm); 120 US standard sieve size (0.125 mm) to 140 US standard sieve size (0.105 mm); 140 US standard sieve size (0.105 mm) to 325 US standard sieve size (0.044 mm); 140 US standard sieve size (0.105 mm) to 270 US standard sieve size (0.053 mm); 140 US standard sieve size (0.105 mm) to 230 US standard sieve size (0.062 mm); 140 US standard sieve size (0.105 mm) to 200 US standard sieve size (0.074 mm); 140 US standard sieve size (0.105 mm) to 170 US standard sieve size (0.088 mm); 170 US standard sieve size (0.088 mm) to 325 US standard sieve size (0.044 mm); 170 US standard sieve size (0.088 mm) to 270 US standard sieve size (0.053 mm); 170 US standard sieve size (0.088 mm) to 230 US standard sieve size (0.062 mm); 170 US standard sieve size (0.088 mm) to 200 US standard sieve size (0.074 mm); 200 US standard sieve size (0.074 mm) to 325 US standard sieve size (0.044 mm); 200 US standard sieve size (0.074 mm) to 270 US standard sieve size (0.053 mm); 200 US standard sieve size (0.074 mm) to 230 US standard sieve size (0.062 mm); 230 US standard sieve size (0.062 mm) to 325 US standard sieve size (0.044 mm); 230 US standard sieve size (0.062 mm) to 270 US standard sieve size (0.053 mm); and 270 US standard sieve size (0.053 mm) to 325 US standard sieve size (0.044 mm).

In embodiments, the sealant attachment zone can be configured to provide aesthetic features or effects, such as shading, creation of shadow lines 61 (FIGS. 6B-6C), an appearance of increased thickness, and other features and/or combinations thereof. In some embodiments, the visible distinctiveness of the sealant attachment zone 41 (FIG. 1A) relative to the remainder of the headlap 13 and the exposure portion 12 also can be configured to provide a visually distinct alignment guide 50 for assisting installers in aligning the cap shingles 10 with previously installed cap shingles during installation on a roof. For example, the sealant attachment zone 41, or at least a portion thereof, can function as an alignment guide 50 of the front edge of the exposure portion of a next cap shingle 10 that can guide a roofer in properly aligning and positioning the cap shingle 10 so as to cover the headlap portion of a previously installed cap shingle without extending over the exposure portion thereof during installation of the cap shingles on a roof.

In exemplary embodiments, the visual distinctiveness of the sealant attachment zone 41 can be a result of the remainder of the headlap 13, outside of the sealant attachment zone 41, including larger particles (e.g., headlap granules) and the sealant attachment zone 41 including fines or particles of a smaller size than the headlap and butt granules, and a reduced amount of granules or no granules (e.g., including an area of no granules, dust, fines, or combinations thereof), or differences in the surfacing media applied to the sealant attachment zone versus the headlap granules (e.g., the type color, amounts, etc. . . . ). In some embodiments, the surfacing materials also can be applied in varying thicknesses or can be otherwise configured to create shading or an appearance of a transition between the headlap portion 13 and the exposure portion 12, such as creating shadow lines 61 as indicated in FIGS. 6B-6C.

In addition, or alternatively, the surfacing media applied along the sealant attachment zone 41 can be configured to define an alignment guide 50 provided by the sealant attachment zone for use by installers to align the front edge 20 of each cap shingle with the rear edge of the exposure portion of a previously installed cap shingle. In an embodiment, the surfacing media can have a different color or shade than the materials of the remainder of the headlap portion 13 and/or the exposure portion 12.

In other embodiments, the alignment guide 50 can comprise at least one marking line such as a paint line or particles with a different and contrasting color, which can be included along a portion of the sealant attachment zone 41, such as along the front edge 43 of the sealant attachment zone 41 proximate to the exposure portion 12 of the cap shingle 10, or can be applied along the rear edge 12A of the exposure portion 12 to enhance the visibility of the point of transition between the headlap and exposure areas for alignment of the cap shingles during installation. In embodiments, one or more marking lines can be located between the headlap granules of the remainder of the headlap portion 13 and the butt granules of the exposure portion 12. In embodiments, the one or more marking lines can have a different or contrasting color or shade than the headlap granules and the butt granules.

In embodiments, materials with high visibility can be used to form the sealant attachment zone 41, such that the sealant attachment zone, and in embodiments, the front edge thereof, are highly visible to an installer for guiding the installer to properly align the cap shingles 10 with one another between courses when installing the cap shingles 10 along a ridge, hip, or cap of a roof. According to exemplary embodiments, the visually distinctive materials of the sealant attachment zone 41 (e.g., marking lines, different color surfacing media, and/or other indicators) can provide an alignment guide that is more easily seen and/or that is less likely to smear or be removed than a paint line alone.

An example of the alignment and bonding of two cap shingles 10 (e.g., in a first course and a second course) is schematically shown in FIGS. 2 and 3A-4B. In the illustrated embodiments, one of the cap shingles 10 is installed along the ridge, hip, or cap of a roof in a first course. Subsequently, a next cap shingle 10 can be aligned with the installed cap shingle 10. For example, the front edge 43 of the sealant attachment zone 41 can be located along each cap shingle 10 between the headlap and exposure portions of the cap shingles, and can define a transition area 60 therebetween, so that the exposure portion of each subsequently installed cap shingle 10 is properly aligned with and overlaps the headlap portion 13 of the previously installed cap shingle 10 (e.g., being aligned with the front edge 43 of the sealant attachment zone 41 FIG. 4A).

When the cap shingles 10 are aligned in this way, the sealant 30 of the subsequently installed cap shingle 10 can extend along and contact the sealant attachment zone 41 of the previously installed cap shingle 10. Accordingly, each cap shingle 10 can be installed onto a previously installed cap shingle 10 (e.g. in an overlapping arrangement) so that the sealant 30 of the next cap shingle to be installed and the sealant attachment zone 41 of the previously installed cap shingle are properly aligned and will be placed into contact so as to provide improved, more direct contact therebetween thus providing enhanced bonding between the sealant 30 and the asphalt material of the cap shingles 10.

For purposes of illustration and not limitation, FIGS. 1A-1B and 5A-5C illustrate example embodiments of a single cap shingle 10. It will also be, and in some embodiments more than one layer of shingle material, understood that the cap shingles 10 can be formed from a web of shingle material and cut into sheets that can include multiple cap shingles 10. In embodiment, the sheets can also include perforation or tear lines separating the individual cap shingles. Multiple cap shingles can be provided in separable sheets for ease of transport.

Figure 5B:
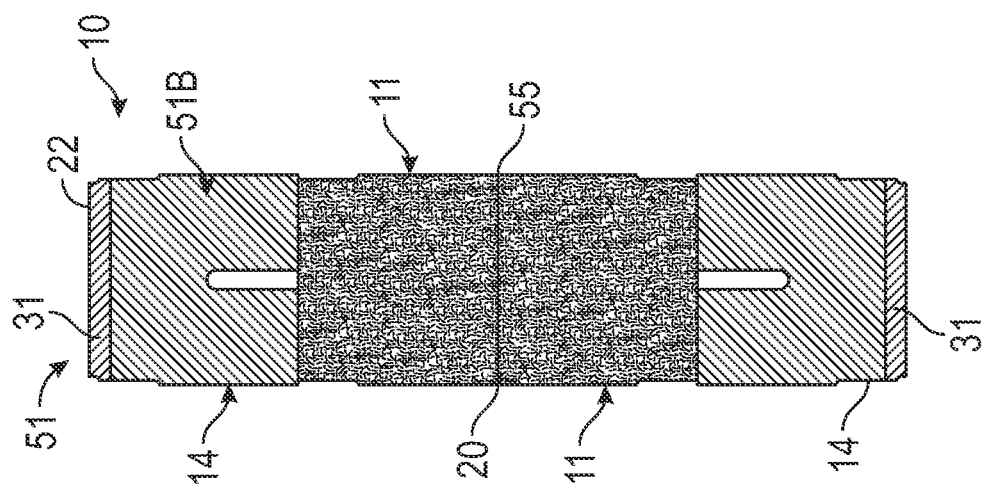
FIGS. 5A and 5B are plan views of a sheet including layers of shingle material configured for forming multiple cap shingles according to embodiments of the present disclosure.
Figure 5A:
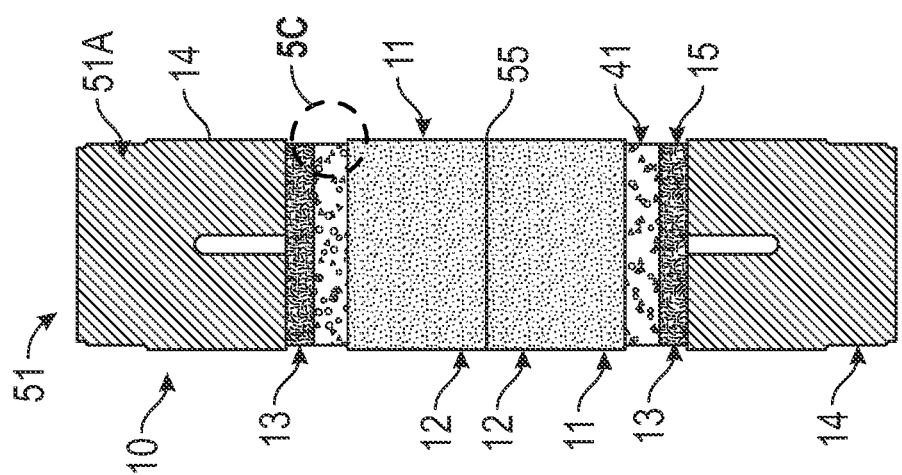

In embodiments, as indicated in FIGS. 5A-5B, the cap shingles 10 can include one or more layers 11 and 14. In some embodiments, the layers 11, 14 of one or more cap shingles 10 can be formed side-by-side along a web of shingle material and can be cut into sheets 51 of shingle material, and from which one or more cap shingles can be formed. For example, in embodiments as shown in FIGS. 5A and 5B, two top layers 11 (e.g., for two different cap shingles 10) can be located along a central portion of the sheet 51 and can be separable from one another along a cut or tear line 53. The sheet 51 also can include two bottom layers 14 (e.g., corresponding to the cap shingles 10 associated with the two top layers 11) disposed at the outer portions of the sheet 51 and separable from the respective inner layers 11 along cut or tear lines 55. FIG. 5A shows a view of a first surface 51A of the sheet 51 corresponding to the uppermost surfaces of the layers 11, 14, and FIG. 5B shows a view of an opposing second surface 51B of the sheet 51 corresponding to the lowermost surfaces of the layers 11, 14. In addition, in the embodiment shown in FIGS. 5A-5B, a release tape 31 can be applied along the second surface 51B adjacent the rear edge 22 of the resultant cap shingle.

As shown in FIG. 5A, in embodiments, each of the top layers 11 can be formed with an exposure portion 12 and a headlap portion 13, wherein the sealant attachment zone 41 is formed in the headlap portion 13. In some embodiments, the sealant attachment zone can be formed as part of the exposure portion 12, e.g., defining a rear or trailing section thereof, or can be formed as an intermediate area between the headlap and exposure portions. FIG. 5C shows a detailed view of a portion of one of the top layers 11, such as shown in the embodiment of FIG. 5A, showing the location of the sealant attachment zone 41 (FIG. 5C) along the headlap portion 13 relative to the exposure portion 12 of the cap shingle (e.g., with the front edge 43 of the sealant attachment zone 41 spaced a short distance from the rear edge of the exposure portion 12). The features of the layers 11, 14 and/or the sheet 51 can have any suitable dimensions without departing from the scope of the disclosure.

In exemplary embodiments, two cap shingles 10 can be formed from the layers 11, 14 of the sheet of shingle material 51 by separating the two bottom layers 14 from the respective top layers 11 along the cut or tear lines 55, and the two top layers 11 can be separated from one another along the cut or tear line 53. The separated layers 11, 14 can be overlapped and bonded together with the lowermost faces of the top layers 11 (the faces visible in FIG. 5B) contacting the uppermost faces of the respective bottom layers 14 (the faces visible in FIG. 5A). The cap shingles 10 could be otherwise formed without departing from the disclosure.

In embodiments, the sealant attachment zone 41 will be configured to help enhance bonding between the cap shingles 10, which can help improve the resistance of the shingles to wind and/or other weather elements when installed as part of a roofing system (e.g., schematically shown in FIG. 2). For example, in embodiments, the cap shingles will be configured with increased wind resistance sufficient to withstand wind uplift forces from high wind speeds of up to and including 90 mph [145 km/h] (Class D in ASTM D7158), in some embodiments, the cap shingles will be configured with increased wind resistance sufficient to withstand wind uplift forces from high wind speeds of up to and including 155 mph [249 km/h] (Class G in ASTM D7158); and in other embodiments, the cap shingles will be configured with increased wind resistance sufficient to withstand wind uplift forces from high wind speeds of up to and including 194 mph [312 km/h] (Class H in ASTM D7158) in accordance with ASTM D3161 and/or D7158. The sealant attachment zone 41 also can function as an installation guide as described above.

In addition, the cap shingles according to embodiments of the present disclosure will be configured to exhibit increased mechanical uplift resistance as measured in accordance with the ASTM D6381 Standard test method for measurement of asphalt shingle tab mechanical uplift resistance. In example testing, cap shingles constructed according to the principles of the present disclosure were tested against two different conventional cap shingles, and as shown in the table below, exhibited a consistently higher maximum load resistance:

| ASTM D 6381 Standard test method for measurement of asphalt shingle tab mechanical uplift resistance Maximum Load [lbf] | | |
| --- | --- | --- |
| Conventional Shingle 1 | Cap Shingle of the Present Disclosure | Conventional Shingle 2 |
| 21.73 | 31.38 | 12.949 |
| 15.63 | 29.71 | 16.878 |
| 16.66 | 26.41 | 18.466 |
| 29.31 | 30.45 | 22.352 |
| 8.02 | 27.52 | 13.814 |
| 20.52 | 37.27 | 12.61 |
| 10.53 | 29.86 | 21.475 |
| 13.01 | 28.11 | 14.189 |
| 12.57 | 29.41 | 20.18 |
| 20.09 | — | 18.524 |

| ASTM D 6381 Standard test method for measurement of asphalt shingle tab mechanical uplift resistance Maximum Load [lbf] | | |
|---|---|---|
| Conventional Shingle 1 | Cap Shingle of the Present Disclosure | Conventional Shingle 2 |
| 14.18 | — | — |
| 18.85 | — | — |
| Mean 16.76 | 30.01 | 17.14 |
| Standard deviation 5.77 | 3.12 | 3.60 |

During testing, samples of each of the Conventional Shingles 1 and 2 were compared to a sample cap shingle constructed according to embodiments of the present disclosure. A series of each of the different sample shingles were mounted along a simulated roof ridge or cap, and were subjected to mechanical edge-lift loading. As can be seen, the cap shingles constructed according to the principles of the present disclosure were found to have a mean maximum load mechanical upload resistance of 30.01 lbf.

Further, in some embodiments, the use of fewer or minimized amounts of particulate materials, smaller particles, and, in some embodiments, no particulate materials, in the sealant attachment zone 41 than are used in the remainder of the headlap 13 outside the sealant attachment zone 41 can result in a savings in costs and/or a reduction in the weight of the cap shingles 10 when compared to cap shingles that do not include a sealant attachment zone formed in the headlap. For example, the use of the sealant attachment zone 41 can save cost in raw materials and the lower weight of the cap shingles with the sealant attachment zones 41 can reduce freight costs. Additionally, the lighter weight of the cap shingles 10 with the sealant attachment zones 41 can be easier to handle and install.

In embodiments, the sealant material 30 of the strips 33 of self-sealing material, and any additional sealant materials applied to the cap shingles, can comprise a self-sealing adhesive including asphalt, filled asphalt, polymer modified asphalts; bitumen, PSA, acrylic adhesives, butyl adhesives or combinations thereof. In embodiments, the sealant material 30 comprises a self-sealing adhesive including an additive including tackifiers, stabilizers, calcium carbonates, limestone fillers, graphite's, intumescent additives, viscosity modified, oils, adhesion promoters, or combinations thereof. In one embodiment, the sealant material 30 has a tackiness at temperatures above 70° F. In one embodiment, the sealant material 30 has a tackiness at temperatures above 65° F. In one embodiment, the sealant material 30 has a tackiness at temperatures above 60° F. In one embodiment, the sealant material 30 has a tackiness at temperatures above 55° F. In one embodiment, the sealant material 30 has a tackiness at temperatures above 50° F. In one embodiment, the sealant material 30 has a tackiness at temperatures above 45° F. In one embodiment, for example, such as for cold weather installations, the sealant material 30 has a tackiness at temperatures above 40° F. Other sealant materials with a tackiness less than 40° F. also can be used.

In addition, in some embodiments, a combination of sealant materials can be used, including two or more sealant materials having different properties. For example, in embodiments, a first sealant material having a tackiness at a lower temperature (e.g., 40° F. or less) can be used in combination with a sealant material having a tackiness at a higher temperature (e.g., greater than 40° F.), with the lower temperature sealant material providing for a faster initial adhesion between the sealant of a next cap shingle and the asphaltic coating along the sealant attachment zone of a previously installed cap shingle when installed in cold weather conditions (e.g., 50° F. or lower), and with this adhesive bond increasing due to the higher temperature sealant material as the cap shingles are exposed to heat from sunlight and/or to increased temperatures.

In embodiments, the asphaltic coatings applied to the top and/or bottom surfaces of the shingle material can include filled asphalts, polymer modified asphalts; bitumen, PSA, acrylic adhesives, butyl adhesives or combinations thereof.

According to embodiments of the present disclosure, a method for forming the cap shingles 10 is provided. In an embodiment, a ribbon or web of shingle material, having first and second surfaces, is moved along a processing path. In embodiments, the web of shingle material can include a woven, non-woven, or laminated fabric (e.g., a multi-layer fabric), a mat, scrim, sheet, fibrous web, or a ribbon of shingle material, or combinations thereof. In embodiments, a coating can be applied to the ribbon or web of shingle material. In embodiments, the coating can include an asphaltic coating applied to its upper and/or lower faces, and in some embodiments, the ribbon or web of shingle material saturated with an asphalt material. In addition, the web of shingle material can comprise a single fabric web or layer of shingle material, or multiple layers of shingle materials.

In embodiments, as the web of shingle material is moved along the processing path, a plurality of granules can be applied along a surface of the shingle material. For example, a first plurality of granules (e.g., headlap granules) can be applied along the surface of the shingle material (e.g., in embodiments, the first surface) that will form the headlap portions and a second plurality of granules (e.g., butt granules) can be applied along the surface of the shingle material along portions of the shingle material that will form the exposure portions of the cap shingles.

Sealant attachment zones can be formed between respective applications of the headlap granules and butt granules to the web of shingle material. In embodiments, the sealant attachment zones can include areas where the asphaltic coating of the web of shingle material left substantially exposed, e.g., where a surfacing media is not applied. In some embodiments, the sealant attachment zones can further include an application of a surfacing media, that can be applied separately from the headlap and butt granules, adapted to promote enhanced adhesion between the asphaltic coating of the first or upper surface of a first cap shingle and a strip of a sealant material of a second cap shingle when the first and second cap shingles are arranged in a stack of cap shingles.

In embodiments, a system for forming the cap shingles can include a tape applicator, a sealant material applicator, such as an applicator wheel, extruder, sprayer, or other devices, and cutters for cutting the web of shingle material to form a plurality of cap shingles. As the web of a shingle material is moved along the processing path, strips of a self-sealing sealant material can be applied to the second surface thereof, e.g., in a pattern such as one or more dots, dashes, lines, or combinations thereof; and surfacing materials can be applied to the sealant attachment zone for example, in embodiments, the web of shingle material can move past one or more applicators that can apply the sealant material, and, in some embodiments, apply the surfacing media.

In embodiments, the web of shingle material can be engaged by a tape applicator that can apply a length of the release tape to the web of shingle material as the web of shingle material is moved in the machine direction. In embodiments, the sealant material applicator can apply strips of a self-sealing sealant material to the lower surfaces of the web of shingle material.

In embodiments, the web of shingle material can move along a path through various stations and past various applicators for applying granules, sealant, a surfacing media, etc. For example, the web of shingle material can move into engagement with a sealant material applicator that, in embodiments, can include one or more spray nozzles, an extruder, or a rotary applicator, which moves, e.g., rotates, in sync with the movement of the web of shingle material to apply the sealant material thereto, which can be formed as one or more strips of a self-sealing material along portions of the web of shingle material. In embodiments, chop cutters can be used to repeatedly cut the web of shingle material for forming the cap shingles 10. In embodiments, the system can be configured to form shingle material sheets 51 (FIGS. 5A-5B), which can be cut into layers 11, 14 and formed into cap shingles 10 as described above.

In embodiments, the exposure portions 12 of the cap shingles 10 can have one or more aesthetic features added. For example, in embodiments, as shown in FIGS. 6A-6C, one or more lines (e.g., shadow lines 61) can be added to the exposure portions and/or to the sealant attachment zone. For example, in embodiments, markings or other aesthetic features can be provides along the rear edge 12A or at a transition point between the exposure portion 12 and the sealant attachment zone 12, such as by painting and/or by using different colored surfacing materials. As shown in FIG. 6B, in some embodiments, a shadow line 61 is included at the rear portions of the exposure portions 12 that provides an illusion of increased depth as compared to the exposure portions 12 without shadow lines shown in FIG. 6A. In another embodiment, two shadow lines 61 can be applied to each edge of the exposure portion 12 of a cap shingle as shown in FIG. 6C, one adjacent each of the front and rear edges of the exposure portion 12 for a further enhanced depth effect.

In another, alternative embodiment, the sealant attachment zone 41 (FIG. 1A) can include a strip of sealant applied along at least a portion thereof. For example, in embodiments, a ribbon or web of shingle material can be fed along a processing path, and a plurality of granules, which can include headlap and butt granules, or combinations thereof, can be applied to selected areas or regions of a surface thereof. In embodiments, a sealant attachment zone also can be defined along the surface of the moving web of shingle material between the applications of the headlap and butt granules.

Thereafter, in embodiments, a strip of sealant material could be applied to the moving ribbon or web of shingle material, with the strip of sealant material having a width and length sufficient to substantially cover a selected area of the upper surface of a cap shingle formed from the ribbon or web of shingle material, adjacent the transition point between the headlap and exposure portions of the cap shingle (for example, adjacent a leading edge of the sealant attachment zone or along the rear edge 12A of the exposure portion 12 of the cap shingle, such as indicted in FIG. 1A). In some embodiments, the strip of sealant material can be applied so as to cover a selected portion of the sealant attachment zone, e.g., less than the full area of the sealant attachment zone; and in some embodiments can be applied with a width and length sufficient to substantially cover the sealant attachment zone.

In embodiments, the ribbon or web of shingle material can continue along its path of travel past one or more cutters that will cut the ribbon or web of shingle materials to form cap shingles. In embodiments, single cap shingles can be formed from the ribbon or web of shingle material. In some embodiments, sheets of multiple cap shingles can be formed, with individual cap shingles being separable from the sheet.

In some embodiments of a method of forming a cap shingle 10, the sealant attachment zone 41 can be formed along a surface of an asphalt coated web of shingle material between the headlap granules and the butt granules applied to the surface of the web of shingle material. In some embodiments, the sealant attachment zone can have a surfacing media applied therealong, which surfacing media will be configured to promote enhanced adhesion between an exposed portion of the asphalt coated surface of the web of shingle material defined by the sealant attachment zone, while also providing protection to the exposed portion of the asphalt coated surface.

In other embodiments, the sealant attachment zone may not have a surfacing media applied thereto and can comprise an area where the portion of the asphalt coated surface of the web of shingle material along which the sealant attachment zone is defined remains substantially exposed to the surrounding environment.

In embodiments, a strip of a sealant material can be applied along the sealant attachment zone, located above the exposure portion of each resultant cap shingle, and positioned between the applied headlap and butt granules. In some embodiments, the strip of sealant material can be applied directly to the asphalt coated surface of the web of shingle material sealant along the sealant attachment zone 41, without a surfacing media, such as fines or other particulate matter, tackifiers, or other surfacing media having been applied to the surface of the web of shingle material along the sealant attachment zone. In some embodiments, the strip of sealant material can be applied over a surfacing media that is previously applied to the sealant attachment zone. Thereafter, in embodiments, a releasable covering material, such as a release tape or other, similar material, can be applied over the strip of sealant material.

In embodiments, the web of shingle material will then be cut into cap shingles, e.g., being cut into individual cap shingles, or into sheets of two or more cap shingles that can be separated into individual cap shingles along tear lines; and stacked and packaged to form cap shingle packages. By arranging the strip of sealant material along the sealant attachment zone defined along the first or upper side of the cap shingles, packaging of the cap shingles may be made simpler and more efficient as the cap shingles may not have to be stacked in pairs with every other cap shingle flipped.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A cap shingle comprising:
   at least one layer of shingle material including:
   a front edge,
   a rear edge,
   an upper surface having a headlap portion adjacent to the rear edge and an exposure portion adjacent to the front edge, a plurality of granules applied to the headlap portion and the exposure portion, and
a lower surface;
wherein the at least one layer of shingle material is configured to bend in an arc along an axis extending in a direction from the rear edge to the front edge for installation along a ridge, hip, or cap of a roof;
a sealant applied along the lower surface of the at least one layer of shingle material; and
a sealant attachment zone positioned along the upper surface of the at least one layer of shingle material between the headlap portion and the exposure portion;
wherein the sealant attachment zone is configured to contact a sealant applied along a lower surface of a next cap shingle installed along the ridge, hip or cap of the roof to promote adhesion between the upper surface of the cap shingle and the sealant of the next cap shingle installed along the ridge, hip or cap of the roof;
wherein the sealant attachment zone comprises:
an exposed portion of the upper surface having no granules; or
a surfacing media applied to the upper surface, wherein the surfacing media comprises a plurality of particles that differ from the granules applied to the headlap portion and the exposure portion and comprise sand, granule fines, composite particles, stone dust, talc, polymer particles, rubber particles, wax, or combinations thereof.

2. The cap shingle of claim 1, further comprising a coating applied to at least the upper surface of the at least one layer of shingle material.

3. The cap shingle of claim 2, wherein the coating comprises filled asphalts, polymer modified asphalts; bitumen, PSA, acrylic adhesives, butyl adhesives, or combinations thereof.

4. The cap shingle of claim 1, wherein the surfacing media comprises polar polymers, adhesion promoters, tackifiers, or combinations thereof.

5. The cap shingle of claim 1, wherein the sealant attachment zone is configured to define an alignment guide for aligning a front edge of the next cap shingle with the headlap portion of the cap shingle.

6. The cap shingle of claim 1, wherein the sealant attachment zone further comprises a paint line, a plurality of particles of a selected color, or combinations thereof, configured to define an alignment guide for aligning a front edge of the next cap shingle over the headlap portion of the cap shingle during installation of the cap shingle and the next cap shingle along the ridge, hip or cap of the roof.

7. The cap shingle of claim 1, wherein the granules comprise a plurality of headlap granules positioned along the headlap portion, and a plurality of butt granules positioned along the exposure portion; wherein the sealant attachment zone is positioned between the headlap granules and the butt granules.

8. The cap shingle of claim 1, wherein the sealant comprises a substantially continuous or discontinuous strip of a self-sealing material.

9. A roofing system comprising:
a plurality of cap shingles positioned along a ridge, hip or cap of a roof, each of the cap shingles comprising:
an upper surface;
a lower surface;
a plurality of peripheral edges;
a plurality of granules applied along a portion of the upper surface;
a sealant disposed along the lower surface;
a sealant attachment zone positioned along the upper surface and configured to promote adhesion between a sealant of a first cap shingle and an asphalt material of an upper surface of a second cap shingle; and
wherein the sealant attachment zone comprises:
an exposed portion of the asphalt material; or
a surfacing media applied to the asphalt material, wherein the surfacing media comprises a plurality of particles that differ from the granules applied to the upper surface and comprise sand, granule fines, composite particles, stone dust, talc, polymer particles, rubber particles, wax, or combinations thereof;
wherein the first and second cap shingles are configured to bend in an arc for installation along the ridge, hip, or cap of the roof; and
wherein the first cap shingle is installed along the ridge, hip or cap of the roof with an exposure portion of the first cap shingle overlapping a headlap portion of the second cap shingle, and with the sealant of the first cap shingle contacting the sealant attachment zone of the second cap shingle.

10. The roofing system of claim 9, wherein the sealant attachment zone is configured to define an alignment guide for aligning a front edge of the first cap shingle with the headlap portion of the second cap shingle.

11. The roofing system of claim 9, wherein when the cap shingles are installed along the ridge, hip, or cap of the roof, the cap shingles configured to resist wind uplift forces from wind speeds of up to 194 mph in accordance with ASTM D3161.

12. The roofing system of claim 9, wherein the sealant attachment zone comprises a surfacing media including a plurality of particles configured to create shading, one or more shadow lines, an appearance of increased thickness, an appearance of a transition between a headlap portion and an exposure portion of the cap shingle, or a combination thereof.

13. A kit comprising:
a plurality of cap shingles, each of the cap shingles comprising:
at least one layer of shingle material having an asphalt material applied thereto;
a front edge;
a rear edge;
an upper surface having an exposure portion adjacent to the front edge and a headlap portion adjacent to the rear edge;
a plurality of granules applied to the headlap portion and the exposure portion;
a lower surface;
a sealant applied along the lower surface and adjacent to the front edge;
a sealant attachment zone positioned along the upper surface between the exposure portion and the headlap portion and configured to promote adhesion of the sealant of the cap shingle to the asphalt material applied to the upper surface of an adjacent cap shingle;
wherein the sealant attachment zone comprises:
an exposed portion of the asphalt material; or
a surfacing media applied to the asphalt material, wherein the surfacing media comprises a plurality of particles that differ from the granules applied to the headlap portion and the exposure portion and comprise sand, granule fines, composite particles, stone dust, talc, polymer particles, rubber particles, wax, or combinations thereof;

wherein each of the cap shingles is configured to bend in an arc along an axis extending in a direction from the rear edge to the front edge for installation along a ridge, hip, or cap of a roof; and wherein when the cap shingles are installed along the ridge, hip or cap of the roof, the sealant attachment zone of each cap shingle is configured to align and engage with a sealant of a next cap shingle installed along the ridge, hip or cap of the roof and promote adhesion between the asphalt material along the upper surface of the cap shingle and the sealant of the next cap shingle.

14. The kit of claim 13, wherein the surfacing media is configured to create shading, one or more shadow lines, an appearance of increased thickness, an appearance of a transition between the headlap and exposure portions of the cap shingles, or a combination thereof.

15. The kit of claim 13, wherein the sealant comprises at least one substantially continuous or discontinuous strip of a self-sealing material.

\* \* \* \* \*